(12) United States Patent
Taubin

(10) Patent No.: US 6,987,511 B2
(45) Date of Patent: Jan. 17, 2006

(54) LINEAR ANISOTROPHIC MESH FILTERING

(75) Inventor: Gabriel Taubin, Hartsdale, NY (US)

(73) Assignee: International Business Machines Corporation, Armonk, NY (US)

(*) Notice: Subject to any disclaimer, the term of this patent is extended or adjusted under 35 U.S.C. 154(b) by 404 days.

(21) Appl. No.: 10/273,807

(22) Filed: Oct. 17, 2002

(65) Prior Publication Data
US 2004/0075659 A1 Apr. 22, 2004

(51) Int. Cl.
G06T 15/00 (2006.01)

(52) U.S. Cl. .................. 345/420; 345/426; 345/611
(58) Field of Classification Search ................ 345/419, 345/420, 426, 581, 606, 611, 616; 353/98
See application file for complete search history.

(56) References Cited

U.S. PATENT DOCUMENTS 6,517,211 B2 * 2/2003 Mihara ..................... 353/98

* cited by examiner

Primary Examiner—Almis R. Jankus
(74) Attorney, Agent, or Firm—Louis P. Herzberg

(57) ABSTRACT

The present invention smoothes a spherical graph signal composed of spherical signal points associated with graph vertices of a graph producing a smoothed spherical graph signal composed of smoothed spherical signal points. Each smoothed spherical signal point is computed by multiplying a vertex rotation matrix by the corresponding spherical signal point. The vertex rotation matrix is computed as a weighted average of neighbor rotation matrices using a local parameterization of the group of rotations. The present invention also filters anisotropically a graph signal composed signal points associated with graph vertices of a graph producing a filtered graph signal composed of filtered signal points. Each filtered signal point is computed as a weighted average of signal points corresponding to the corresponding graph vertices and neighbor graph vertices with neighbor weight matrices. The present invention also denoises the vertex positions of a polygon mesh without tangential drift. The face normals are smoothed on the dual graph of the polygon mesh. The smoothed face normals are used to construct neighbor weight matrices on the primal graph of the polygon mesh. The vertex positions are anisotropically filtered on the primal graph of the polygon mesh. The present invention also filters the vertex positions and face normals of a polygon mesh with interpolatory vertex positions and face normal constraints.

50 Claims, 26 Drawing Sheets

```
LaplacianOperator (G, W, x)
    if (non-linear)
        W = ComputeWeights (x)
    new Δx = 0
    for (e = (i,j) ∈ E)
        Δx_i = Δx_i + w_{ij}(x_j - x_i)
    end
    return Δx
```

Fig. 23

```
LaplacianSmoothing (G, W, N, λ, x)
    new Δx
    for (h = 0...N-1)
        Δx = LaplacianOperator (G, W, x)
        for (i = 0...V -1)
            x_i = x_i + λΔx_i
        end
    end
return
```

Fig. 24

```
MeshFilter (G, W, N, λ, x)
    new Δx
    for (h = 0...N-1)
        Δx = LaplacianOperator (G, W, x)
        for (i = 0...V -1)
            x_i = x_i + λ_iΔx_i
        end
    end
return
```

Fig. 25

```
LaplacianOperatorNormals (G, W, n)
    new Σ = 0
    for (e = (i,j) ∈ E)
        Σ_i = Σ_i + w_{ij} n_j
    end
    for (i = 0...N -1)
        Σ_i = n_i x Σ_i
    end
return Σ

MeshFilterNormals (G, W, N, λ, n)
    new Σ
    for (h = 0...N -1)
        Σ =LaplacianOperatorNormals (G, W, n)
        for (i = 0...V -1)
            n_i = R(λ_h Σ_i) n_i
        end
    end
return
```

Fig. 27

LINEAR ANISOTROPHIC MESH FILTERING

FIELD OF THE INVENTION

This invention relates to the field of smoothing of signals defined on graphs and shapes approximated by polygon meshes. In particular this invention relates to the field of smoothing polygon meshes.

BACKGROUND OF THE INVENTION

Polygon meshes are widely used in computer aided geometric design, geometric modeling, medical imaging, and computer graphics to represent surfaces in digital form. Polygon meshes are described in detail in U.S. Pat. No. 5,506,947 "Curve and Surface Smoothing Without Shrinkage," by G. Taubin, and in the paper "A Signal Processing Approach To Fair Surface Design," by G. Taubin, Siggraph'95 Conference Proceedings, August 1995, pages 351–358, both are incorporated herein by reference in its entirety for all purposes. A polygon mesh includes a polygon mesh connectivity and at least one polygon mesh signal.

A polygon mesh connectivity includes a plurality of polygon mesh vertices, and polygon mesh faces. Each polygon mesh face is a cycle of three or more polygon mesh corners. Each polygon mesh corner corresponds to one of the polygon mesh vertices. Every polygon mesh face is said to be supported by its polygon mesh corners. A polygon mesh edge is an unordered pair of mesh vertices that are consecutive in at least one polygon mesh face, in which case the polygon mesh edge is said to be on the boundary of the polygon mesh face, and to join the two polygon mesh vertices, and the polygon mesh face is said to be incident to the polygon mesh edge. The two polygon mesh vertices are called the ends of the polygon mesh edge. One or more polygon mesh faces may be incident to the same polygon mesh edge. A boundary edge is a polygon mesh edge with exactly one incident polygon mesh face. A regular edge is a polygon mesh edge with exactly two incident polygon mesh faces. A singular edge is a polygon mesh edge with three or more incident polygon mesh faces. The ends of boundary edges are called boundary vertices, and the remaining polygon mesh vertices are called internal vertices. Polygon meshes are well known to those skilled in the prior art.

A graph is composed of a plurality of graph vertices and graph edges, with each graph edge being an unordered pair of graph vertices. Each graph edge is said to connect or to join its two graph vertices, and to be incident to each one of the two graph vertices. Two graph vertices connected by a graph edge are called neighbors. The vertex neighborhood of a graph vertex of a graph is the set of graph vertices of the graph connected to the graph vertex by a graph edge of the graph. A neighbor graph vertex of the graph vertex is a member of the neighborhood of a graph vertex. Graphs are well known to those skilled in the prior art.

The primal graph of a polygon mesh connectivity is a graph with the polygon mesh vertices of the polygon mesh connectivity as primal graph vertices, and the polygon mesh edges of the polygon mesh connectivity as primal graph edges. The dual graph of a polygon mesh connectivity is a graph with the polygon mesh faces of the polygon mesh connectivity as dual graph vertices, and a plurality of dual graph edges. Each dual graph edge corresponds to a particular regular edge of the polygon mesh connectivity, and is composed of the two polygon mesh faces which the regular edge is incident to. The vertex star of a polygon mesh vertex of a polygon mesh is the neighborhood of the polygon mesh vertex in the primal graph of the polygon mesh. The face star of a polygon mesh face of a polygon mesh is the neighborhood of the polygon mesh face in the dual graph of the polygon mesh.

A graph signal on a graph is composed of signal points. Each signal point is a point in a N-dimensional space and corresponds to one of the graph vertices of the graph. The signal points of a graph signal may represent different properties, such as space positions, color vectors, normal vectors, and texture coordinates used to render images of the graph. The signal points of a graph signal may also represent physical properties such as temperature or mechanical strain forces associated with numerical simulations. A spherical graph signal is a graph signal in which all the signal points belong to a N-dimensional sphere of constant radius. A graph signal operator takes an input graph signal as input, and produces an output graph signal on the same graph as output. The value of each output signal point can be a function of zero or more input signal points, and of zero or more operator parameters. Examples of graph signal operators are introduced later in this disclosure.

A polygon mesh signal can be either a primal mesh signal or a dual mesh signal.

A primal mesh signal of a polygon mesh is composed of primal points. Each primal point is a point in a N-dimensional space and corresponds to one of the polygon mesh vertices of the polygon mesh connectivity. The primal points of a primal mesh signal may represent different properties of the polygon mesh, such as vertex positions which define the geometry of the polygon mesh, color vectors, normal vectors, and texture coordinates used to generate pictures of the shape represented by the polygon mesh. The primal points of a primal mesh signal may also represent physical properties such as temperature or mechanical strain forces associated with numerical simulations. In this disclosure the primal mesh signal defined by the vertex positions of a polygon mesh is called the vertex position signal of the polygon mesh. A primal mesh signal is also a graph signal on the primal graph of the polygon mesh connectivity. The vertex position signal of a polygon mesh is a graph signal on the primal graph of the polygon mesh connectivity. In this disclosure, the primal points of a vertex position signal are called vertex positions.

A dual mesh signal of a polygon mesh is composed of dual points. Each dual point is a point in a N-dimensional space and corresponds to one polygon mesh face of the polygon mesh connectivity. The dual points of a dual mesh signal may represent different properties of the polygon mesh, such as face normal vectors which define the orientation of the polygon mesh faces, and color vectors, used to generate pictures of the shape represented by the polygon mesh. A dual mesh signal is also a graph signal on the dual graph of the polygon mesh connectivity. In this disclosure the dual mesh signal defined by the face normal vectors of a polygon mesh is called the face normal signal of the polygon mesh. The face normal signal of the polygon mesh is a spherical graph signal on the dual graph of the polygon mesh connectivity. In this disclosure, the dual points of a face normal signal are called face normals. Sometimes polygon meshes are constructed as the result of measurements performed by a three-dimensional camera, laser scanner, CAT scanner, or other three-dimensional shape measurement device. These polygon meshes approximate the topology and geometry of a physical object, as opposed to of a virtual object created in a computer without a physical realization. Data obtained as a result of physical measurements contain noise. Mesh smoothing algorithms are used to remove noise from polygon mesh signals. Mesh smoothing algorithms operate on either primal mesh signals or dual mesh signals. Mesh smoothing algorithms are also referred to herein as mesh smoothing operators. Prior art mesh smoothing algorithms are described in the paper "Linear Anisotropic Mesh Filtering" by Gabriel Taubin, IBM Research Report RC-22213, Oct. 18, 2001, which is here incorporated by reference in its entirety. Mesh smoothing operators are also used as design tools in interactive geometric modeling systems, in conjunction with other mesh operators that modify the topology and/or the geometry of polygon meshes. Amongst these other mesh operators, connectivity refinement schemes based on recursive subdivision are particularly important to design geometric models within a multi-resolution framework. In this context it is important to be able to apply smoothing operators locally, adaptively, and also with more general constraints. In addition to being able to constrain certain vertex positions, it is also desirable to be able to specify the values of some normal vectors, particularly along curves defined by mesh edges. With normal vector constraints surface patches can be joined with tangent plane continuity, and the sharpness of ridge curves embedded in the surfaces can be controlled.

Algorithms with linear time and space complexity are desirable to operate on large data sets, particularly for applications such as surface design and polygon mesh editing, where interactive rates are a primary concern. The simplest polygon mesh smoothing algorithm that satisfies these linear complexity requirements is Laplacian smoothing. Most mesh smoothing algorithms derive from Laplacian smoothing. Laplacian smoothing is a simple and widely used algorithm for denoising polygon mesh signals. It was first introduced to improve the quality of finite element meshes used in engineering applications to perform numerical simulations of physical phenomena. In this context the vertex positions signal of a polygon mesh is two-dimensional, and the polygon mesh connectivity has boundary mesh vertices as well as internal mesh vertices. Vertex positions corresponding to boundary mesh vertices are constrained not to move, but vertex positions corresponding to internal mesh vertices are simultaneously moved to the corresponding output vertex positions computed by a Laplacian smoothing operator. And then the process is iterated a number of times.

A Laplacian operator is a particular type of graph signal operator. When a Laplacian operator is applied to a graph signal, it produces a Laplacian displacement signal. In this disclosure the signal points of the Laplacian displacement signal are called Laplacian displacements. The Laplacian displacement corresponding to a graph vertex is computed as a sum of a plurality of weighted neighbor displacements, with each weighted neighbor displacement corresponding to one neighbor graph vertex of the graph vertex and equal to a neighbor weight multiplied by a neighbor displacement. The neighbor displacement is computed by subtracting the signal point of the vertex graph from the signal point of the neighbor graph vertex. In the prior art the neighbor weights have scalar values. In this disclosure a Laplacian smoothing operator with scalar neighbor weights is called isotropic Laplacian operator. The values for the neighbor weights can be chosen in different ways. One common method used in the prior art is to set each neighbor weight corresponding to a neighbor vertex of a graph vertex equal to the inverse of the number of elements in the vertex neighborhood of the graph vertex. In this disclosure we refer to this particular Laplacian operator as the Laplacian operator with valence weights. This is one example of linear Laplacian operator, where the neighbor weights are not function of the values of the signal points of the graph signal upon which the Laplacian operator is applied. Other linear Laplacian operators have been proposed in the prior art. Examples of linear Laplacian operators, where the weights are chosen to smooth mesh boundaries and to enhance mesh creases, are discussed in the paper "A Signal Processing Approach To Fair Surface Design," by G. Taubin, Siggraph'95 Conference Proceedings, August 1995, pages 351–358, mentioned above. In a nonlinear Laplacian operator the neighbor weights are computed as function of the values of the signal points of the graph signal upon which the Laplacian operator is applied. Non-linear Laplacian operators have been proposed in the prior art. The main problem with non-linear Laplacian operators is that it is significantly more computationally expensive to evaluate them. It is also more difficult to analyze their behavior because of the non-linearities. Linear and non-linear Laplacian operators are discussed in the paper "Linear Anisotropic Mesh Filtering" by Gabriel Taubin, IBM Research Report RC-22213, Oct. 18, 2001.

A Laplacian smoothing step is a graph signal operator defined by a Laplacian smoothing operator and a smoothing parameter. In the prior art, the smoothing parameter is typically a single number, which is independent of both the graph, and the graph signal upon which the Laplacian operator is applied. The smoothing parameter can also be incorporated by multiplication into the neighbor weights of the Laplacian smoothing operator, in which case the Laplacian smoothing steps is equal to the Laplacian smoothing operators. In some cases it is better to combine the smoothing operator with the neighbor weights, and in other cases it is better to have the smoothing parameter as a separate entity. The smoothing parameter can also be a one-dimensional graph signal on the same graph, with a different value for each graph vertex. The former case, where the smoothing parameter is a single number, can also be regarded as a graph signal, where all the smoothing parameter signal points have the same value. In both cases each output graph signal point corresponding to a vertex graph is computed as the sum of the input signal point corresponding to the same graph vertex plus a scaled displacement. The scale displacement is computed as the product of a smoothing parameter signal point times a Laplacian displacement, with both the smoothing parameter signal point and the Laplacian displacement corresponding to the same graph vertex.

Note that when a Laplacian smoothing step is applied to a graph signal, the result is another graph signal, but when a Laplacian smoothing step is applied to a spherical signal, the result is usually no longer a spherical signal. Laplacian smoothing can be used to smooth the spherical graph signal on the graph to produce a Laplacian graph signal composed of Laplacian signal points. But the resulting Laplacian signal points would no longer be of the same length as the spherical signal points. Each one of the Laplacian signal points can be normalized to the common length of the spherical signal points, if non zero. But there is no guarantee that all the Laplacian signal points will be non-zero, particularly if large angles exist between spherical signal points associated to neighboring graph vertices. No solution to this problem is known in the prior art.

The vertex position signals of polygon meshes used in computer aided geometric design, geometric modeling, medical imaging, and computer graphics to represent surfaces in digital form are usually three-dimensional, because these polygon meshes are used to approximate smooth surfaces embedded in three-dimensional space, rather than the planar two dimensional regions used in the mesh generation applications. In addition, these polygon meshes very often do not have boundaries. In these cases the Laplacian smoothing algorithm is applied without constraints, where all the output graph signal points are computed as the sum of the corresponding input signal points plus the product of a smoothing parameter times the corresponding Laplacian displacements. Sometimes the smoothing parameter is not explicitly referred to because it is embedded in the neighbor weights used to compute the Laplacian displacements. When Laplacian smoothing is applied to a noisy vertex position signal of a polygon mesh without constraints, noise is removed, but significant shape distortion may be introduced, caused mainly by two problems: shrinkage and tangential drift.

When a large number of Laplacian smoothing steps are iteratively performed with the same smoothing parameter, the shape undergoes significant deformations, eventually converging to the centroid of the original data. This problem is also called "shrinkage". A simple modification to the Laplacian smoothing algorithm that solves the shrinkage problem, where the smoothing parameter alternates between a positive value and a negative value from iteration to iteration, is described in the paper "A Signal Processing Approach To Fair Surface Design," by G. Taubin, Siggraph'95 Conference Proceedings, August 1995, pages 351–358, and in U.S. Pat. No. 5,506,947 "Curve and Surface Smoothing Without Shrinkage," by G. Taubin. A number of other enhancements to Laplacian smoothing, introduced in recent years, are described in the paper "Geometric Signal Processing on Polygonal Meshes", by G. Taubin, Eurographics 2000 State of The Art Report, September 2000, Each Laplacian displacement produced by a Laplacian smoothing operator can be decomposed as the sum of two components, a tangential component and a normal component. Signal noise is contained in the normal component. When the lengths of the edges of a polygon mesh are not very uniform, the tangential components are not insignificant. The Laplacian displacements tend to make the lengths of the mesh edges more uniform. In addition to removing signal noise, the Laplacian smoothing algorithm may introduce significant tangential displacements. In some applications, such as when polygon meshes have associated textures mapped on them, this becomes a problem. To overcome this problem, referred to as the "tangential drift" problem, several modifications have been proposed in the prior art based on redefined non-linear Laplacian operators, where the neighbor weights are computed as function of the data. As mentioned above, non-linear Laplacian operators are undesirable because of the additional computational cost, and potential computational instabilities, which are difficult to analyze and predict. No solution to the tangential drift problem is known in the prior art based on linear Laplacian operators.

The ability to impose constraints to the smoothing process, such as specifying the position of some vertices, values of some normal vectors, the topology and geometry of ridge curves, or the behavior of the smoothing process along the boundaries of the mesh, is needed in the context of freeform interactive shape design. In the Laplacian smoothing algorithm and its linear derivatives, imposing interpolatory vertex position constraints is easy, but imposing interpolatory normal constraints is not. There is no solution to the problem of simultaneously imposing vertex positions and face normal constraints in the prior art based on a linear Laplacian operator.

SUMMARY OF THE INVENTION

An aspect of this invention is provision of methods for smoothing spherical graph signals on graphs.

A second aspect of this invention is provision of methods for anisotropic filtering graph signals on graphs.

A third aspect of this invention is provision of methods for denoising the vertex positions of polygon meshes preventing tangential drift.

A fourth aspect of this invention is provision of methods for smoothing the vertex positions of polygon meshes with interpolatory constraints on vertex positions and face normals.

The present invention includes a spherical graph signal smoothing method to smooth a spherical graph signal producing a smoothed spherical graph signal. The spherical graph signal is composed of spherical signal points, with each spherical signal point corresponding to one graph vertex of a graph. All the spherical signal points being points in a N-dimensional sphere and having the same length. The smoothed spherical graph signal is composed of smoothed spherical signal points, with each smoothed spherical signal point corresponding to one graph vertex of the graph. All the smoothed spherical signal points being points in the same N-dimensional sphere and having the same length as the spherical signal points.

When an isotropic Laplacian smoothing step is applied to a spherical graph signal, the result is usually no longer a spherical graph signal. The spherical graph signal smoothing method of the present invention solves these problems by using a plurality of vertex rotation matrices, with each vertex rotation matrix corresponding to one graph vertex of the graph. The spherical graph signal smoothing method computes each smoothed spherical signal point as the product of one vertex rotation matrix times one spherical signal point, where the smoothed signal point, the vertex rotation matrix, and the spherical signal point correspond to the same vertex. This guarantees that the smoothed signal point has the same length as the spherical signal point.

Each vertex rotation matrix is computed as a weighted average of a plurality of neighbor rotation matrices using a local parameterization of the group of N-dimensional rotations. Each neighbor rotation matrix corresponds to a neighbor graph vertex in the vertex neighborhood of the graph vertex corresponding to the vertex rotation matrix. In a preferred implementation the neighbor rotation matrix represents a plane rotation that decomposes N-dimensional space into a plane and an invariant subspace, the plane and an invariant subspace being orthogonal subspaces and spanning the N-dimensional space. In a more preferred implementation the spherical signal point corresponding to the graph vertex, and the spherical signal point corresponding to the neighbor graph vertex belong to the plane. In a still more preferred implementation the product of the neighbor rotation matrix times the spherical signal point corresponding to the graph vertex is equal to the spherical signal point corresponding to the neighbor graph vertex. Each local parameterization has an inverse local parameterization. The weighted averaging and scaling of these neighbor rotation matrices is done in the domain of a local parameterization by first computing a neighbor parameter value for each of the neighbor rotation matrices, the neighbor parameter value being equal to the inverse local parameterization evaluated at the neighbor rotation matrix. Then computing a weighted average parameter value as the sum of a plurality of weighted neighbor parameter values, each weighted neighbor parameter value corresponding to one of the neighbor vertices, each weighted neighbor parameter value being equal to the product of the neighbor weight times the neighbor parameter value corresponding to said neighbor vertex. And finally, evaluating the local parameterization at the weighted average parameter value to produce the vertex rotation matrix. This approach is stable, robust, and guaranteed to produce a graph signal composed of equal length signal points. Also, by carefully choosing the local parameterization of the group of rotations, the evaluation of this operator is as efficient as the classical Laplacian operator. Examples of local parameterizations known in the prior art are: the exponential map parameterization, the Quaternions parameterization, and Cayley's rational parameterization.

The present invention also includes a method to anisotropic filtering a graph signal producing a filtered graph signal. The graph signal is composed signal points, with each signal point corresponding to one graph vertex of a graph. The filtered graph signal is composed of filtered signal points, with each filtered signal point corresponding to one graph vertex of the graph. Each filtered signal point is computed by adding a vertex displacement to the corresponding signal point. The vertex displacements are vectors in N-dimensional space that define a vertex displacement signal on the same graph with one vertex displacement corresponding to each graph vertex of the graph. Each vertex displacement corresponding to a graph vertex of the vertex graph is computed as a sum of a plurality of weighted neighbor displacements, where each weighted neighbor displacement corresponds to one neighbor graph vertex in the vertex neighborhood of the vertex graph and is equal to the product of a neighbor weight matrix times a neighbor displacement. Here the neighbor weight matrix is a matrix with N rows and N columns corresponding to the neighbor graph vertex, and the neighbor displacement is computed by subtracting the signal point corresponding to the graph vertex from the signal point corresponding to the neighbor graph vertex. The neighbor weight matrices can be regarded as a discrete diffusion tensor field that reinforces certain directions and attenuates others. In the Laplacian smoothing algorithm with scalar weights all the directions are given the same weight. The degree of anisotropy can be controlled by using neighbor weight matrices computed as affine combinations of the given matrix weights and the given scalar weights.

The present invention also includes a polygon mesh denoising method to denoise the vertex positions of a polygon mesh without tangential drift. In a first step the face normals are smoothed on the dual graph of the polygon mesh using the method for smoothing spherical graph signals of this invention. In a second step the smoothed face normals are used to construct neighbor weight matrices on the primal graph of the polygon mesh. Each neighbor weight matrix corresponds to a neighbor polygon mesh vertex that belongs to the vertex star of one polygon mesh vertex. In a preferred implementation each neighbor weight matrix is computed as the average of the face projection matrices corresponding to the faces incident to the primal graph edge defined by the polygon mesh vertex and the neighbor polygon mesh vertex, the primal graph edge associated with the neighbor weight matrix, each of the face projection matrices being an orthogonal projection matrix onto the plane supporting the corresponding polygon mesh face. In a third step the vertex positions of the polygon mesh are filtered on the primal mesh of the polygon mesh using the method to anisotropic filtering graph signals of this invention. In the preferred implementation where each neighbor weight matrix is computed as the average of the face projection matrices, tangential drift is prevented because the tangential components of the displacement vectors are attenuated, and the normal components are enhanced. Other anisotropic Laplacian operators can be constructed to produce different effects.

The present invention also includes a method for smoothing the vertex positions of a polygon mesh with interpolatory constraints on vertex positions and face normals. The method uses a set of unconstrained polygon faces and a set of unconstrained polygon vertices, the set of unconstrained polygon faces containing polygon faces of the polygon mesh connectivity, the set of unconstrained polygon vertices containing polygon vertices of the polygon mesh connectivity. In a first step the face normals corresponding to polygon mesh faces in the set of unconstrained polygon mesh faces are smoothed on the dual graph of the polygon mesh using the method for smoothing spherical graph signals of this invention. In a second step the face normals corresponding to the polygon mesh faces in the set of unconstrained polygon mesh faces are replaced by the smoothed face normals computed in the first step. In a third step the face normals are used to construct neighbor weight matrices on the primal graph of the polygon mesh. Each neighbor weight matrix corresponds to a neighbor polygon mesh vertex that belongs to the vertex star of one polygon mesh vertex. In a preferred implementation each neighbor weight matrix is computed as the average of the face projection matrices corresponding to the faces incident to the primal graph edge defined by the polygon mesh vertex and the neighbor polygon mesh vertex, the primal graph edge associated with the neighbor weight matrix, each of the face projection matrices being an orthogonal projection matrix onto the plane supporting the corresponding polygon mesh face.

BRIEF DESCRIPTION OF THE DRAWINGS

FIG. 23 shows an algorithm to evaluate the Laplacian operator. C=(V,E) directed graph, W matrix of weights defined on the edges of C, x input signal on C, Ax output signal. The isotropic scalar weight w~ is replaced by a matrix weight ~ in the anisotropic case.

FIG. 24 shows the Laplacian Smoothing Algorithm. C graph, W matrix of weights defined on the edges of C, N number of iterations, A scaling factor, x signal on C to be smoothed. The algorithm is the same, whether the Laplacian operator is linear or non-linear and isotropic or anisotropic.

FIG. 25 shows a mesh filter more general than Laplacian smoothing can be implemented by making the scaling factor A function of the iteration number. Compare to the algorithm in FIG. 24. Again, the same algorithm applies to the linear or non-linear Laplacian operator, and to the isotropic or anisotropic cases.

FIG. 27 shows algorithms to evaluate the Laplacian operator, and a general linear filter on a graph signal with values the unit sphere. Laplacian smoothing corresponds to the case of constant $Lamda_h$.

DETAILED DESCRIPTION OF THE INVENTION

Figure 1:
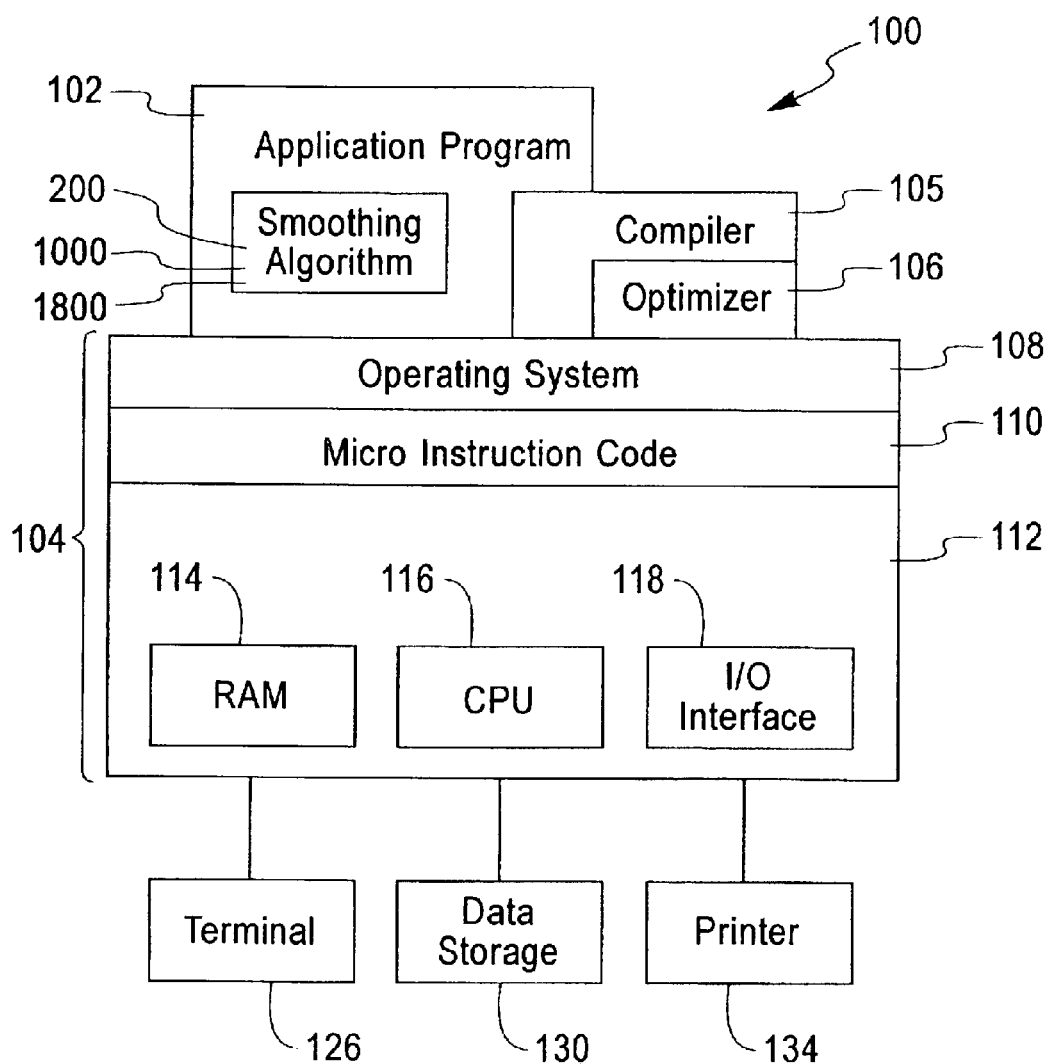
FIG. 1 is a block diagram showing an example computer system 100 on which a preferred embodiment of the present invention operates.

FIG. 1 is a block diagram showing an example computer system 100 on which a preferred embodiment of the present invention operates. The preferred embodiment includes one or more application programs 102. One type of application program 102 is a compiler 105, which includes an optimizer 106. The compiler 105 and optimizer 106 are configured to transform a source program into optimized executable code. More generally, the source program is transformed to an optimized form and then into executable code. The compiler 105 and optimizer 106 operate on a computer platform 104 that includes a hardware unit 112. Some application programs 102 that run on the system 100 include the spherical graph signal smoothing method 200, and the anisotropic graph signal filtering method 1000, described below.

The hardware unit 12 includes one or more central processing units (CPU) 116, a random access memory (RAM) 114, and an input/output interface 118. Microinstruction code 110, for instance a reduced instruction set, may also be included on the platform 104. Various peripheral components may be connected to the computer platform 10304 including a graphical interface or terminal 126, a data storage device 130, and a printing device 134. An operating system 108 coordinates the operation of the various components of the computer system 100. An example of computer system 100 like this is the IBM RISC System/6000 (RISC System/6000 is a trademark of the IBM Corporation.). It is readily understood that those skilled in the computer arts will be familiar with many equivalent computer systems 100.

Figure 2:
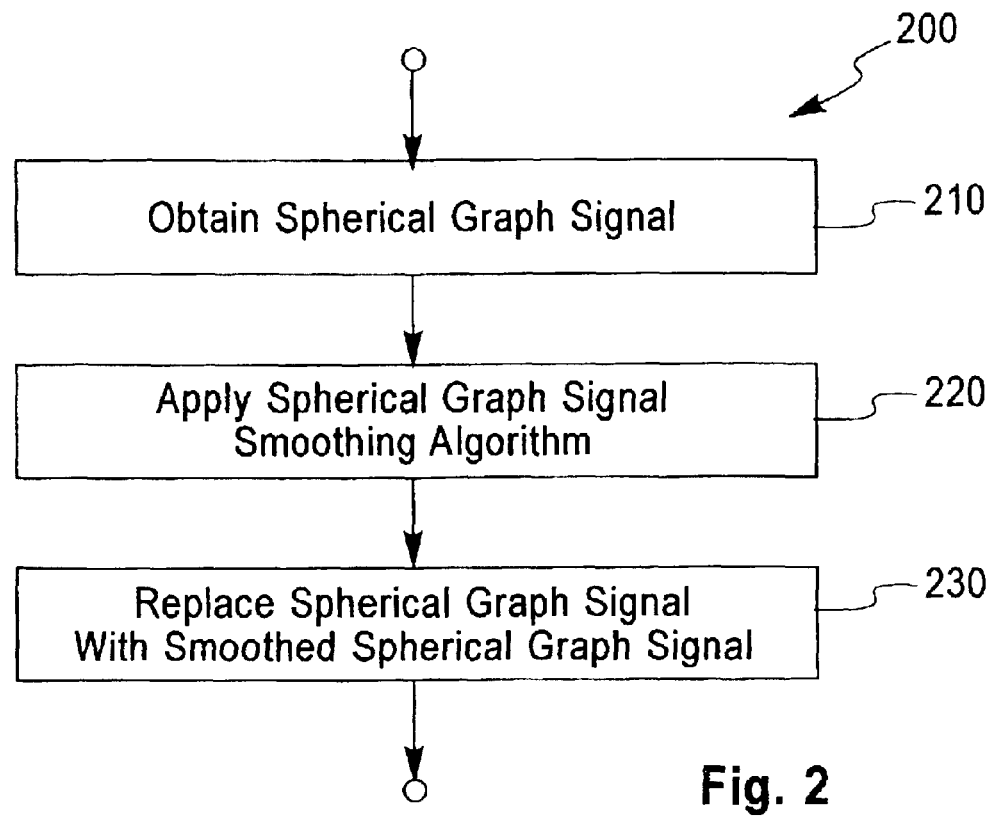
FIG. 2 is a flow chart showing the steps of the spherical graph signal smoothing method.

FIG. 2 is a flow chart showing the steps of the spherical graph signal smoothing method 200 run by the computer system 100. In step 210 a spherical graph signal is obtained. The spherical graph signal is composed of spherical signal points, with each spherical signal point corresponding to one graph vertex of a graph. All the spherical signal points being points in a N-dimensional sphere and having the same length. n step 220 a spherical graph smoothing algorithm is applied to the spherical graph signal producing a smoothed spherical graph signal. The smoothed spherical graph signal is composed of smoothed spherical signal points, with each smoothed spherical signal point corresponding to one graph vertex of the graph. All the smoothed spherical signal points being points in the same N-dimensional sphere and having the same length as the spherical signal points. In step 220 the spherical graph signal is replaced by the smoothed spherical graph signal.

Figure 3:
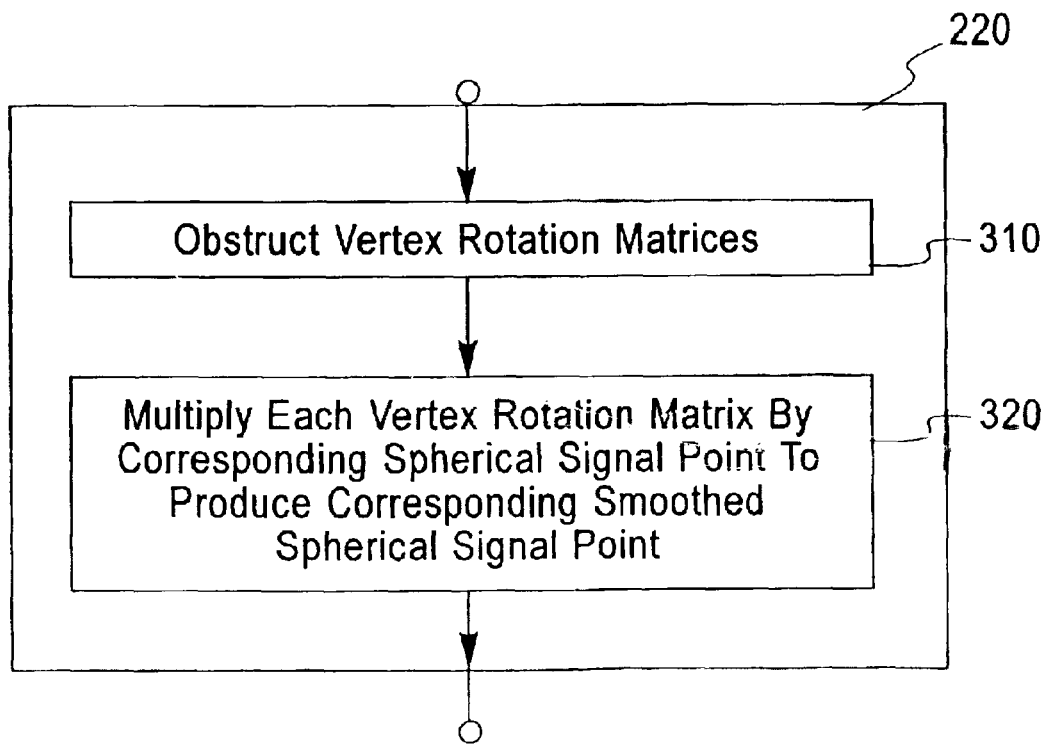
FIG. 3 is a flow chart showing the steps of a preferred embodiment of a step of the method of FIG. 2 where a spherical graph signal smoothing algorithm is applied.

FIG. 3 is a flow chart showing the steps of a preferred embodiment of the spherical graph signal smoothing algorithm 220. In step 310 a plurality of vertex rotation matrices are constructed, with each vertex rotation matrix corresponding to one graph vertex of the graph. In step 320 the spherical graph signal smoothing algorithm computes each smoothed spherical signal point as the product of one vertex rotation matrix times one spherical signal point, where the smoothed signal point, the vertex rotation matrix, and the spherical signal point correspond to the same vertex. This guarantees that the smoothed signal point has the same length as the spherical signal point.

Figure 4:
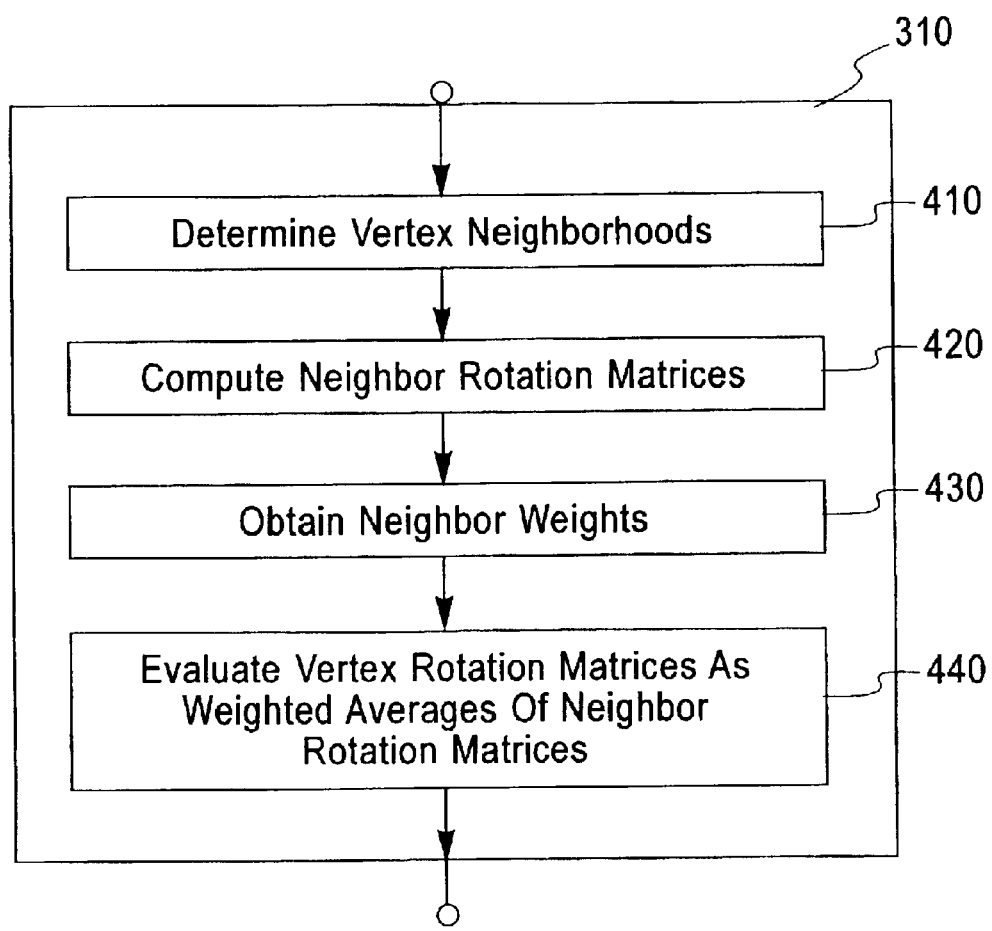
FIG. 4 is a flow chart showing the steps of a preferred embodiment of the flow chart of FIG. 3 where the vertex rotation matrices are constructed.
Figure 5:
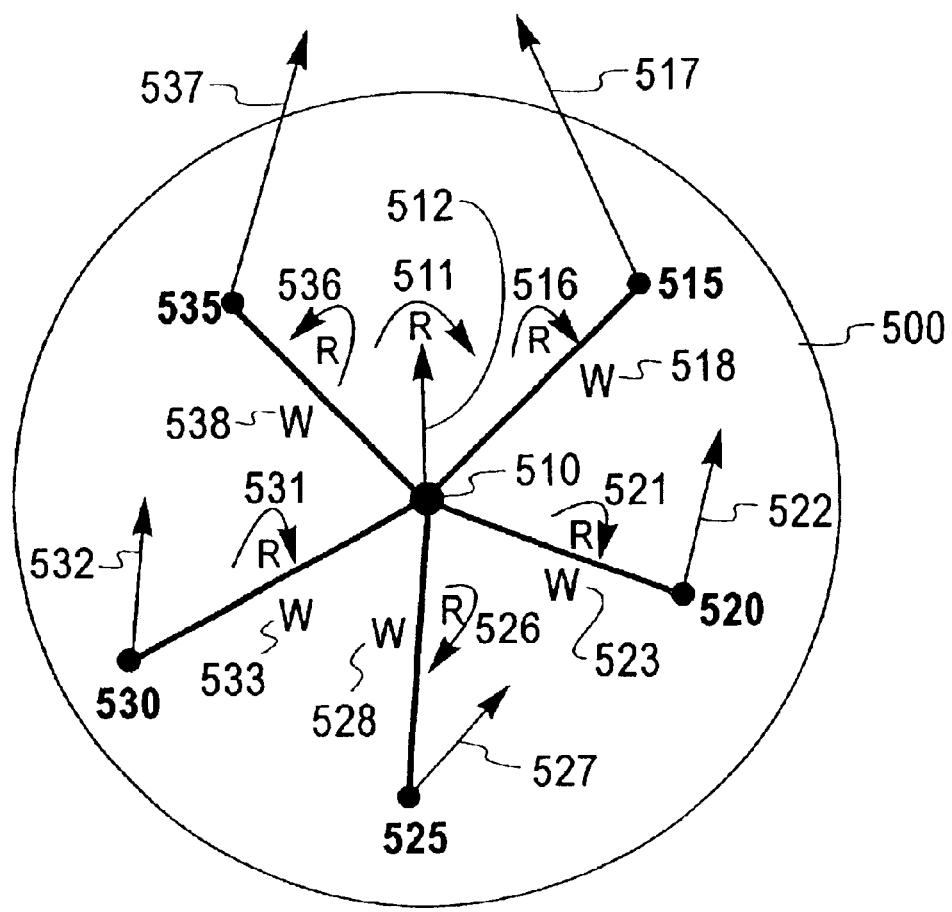
FIG. 5 is a diagram showing a vertex neighborhood of a graph vertex of a graph.

FIG. 4 is a flow chart showing the steps of a preferred embodiment of the step 310 where the vertex rotation matrices are constructed. FIG. 5 is a diagram showing a vertex neighborhood 500 of a graph vertex 510 of a graph. The vertex neighborhood 500 is composed of neighbor graph vertices 515, 520, 525, 530, and 535. FIG. 5 also shows the spherical signal points 512, 517, 522, 527, 532, and 537 of the spherical signal corresponding to the graph vertices 510, 515, 520, 525, 530, and 535, respectively. In step 410 the vertex neighborhood 500 of vertex 510 is determined. In this preferred embodiment the vertex rotation matrix 511 corresponding to graph vertex 510 is computed as a weighted average of a plurality of neighbor rotation matrices 516, 521, 526, 531, and 536. Each neighbor rotation matrix corresponds to one particular neighbor graph vertex in the vertex neighborhood of the graph vertex corresponding to the vertex rotation matrix. In FIG. 5, the neighbor rotation matrices 516, 521, 526, 531, and 536 correspond to the neighbor graph vertices 515, 520, 525, 530, and 535 respectively. In step 420 the neighbor rotation matrices are computed. In step 430 the neighbor weights are obtained, with one neighbor weight corresponding to each neighbor rotation matrix. In FIG. 5, the neighbor weights 518, 523, 528, 533, and 538, correspond to the neighbor rotation matrices 516, 521, 526, 531, and 536, respectively. In step 440 each vertex rotation matrix 511 is evaluated as the weighted average. Of the neighbor rotation matrices 516, 521, 526, 531, and 536 with corresponding neighbor weights 518, 523, 528, 533, and 538.

In a preferred implementation each of the neighbor rotation matrices 516, 521, 526, 531, and 536, represents a plane rotation that decomposes N-dimensional space into a plane and an invariant subspace, the plane and an invariant subspace being orthogonal subspaces and spanning the N-dimensional space. In a more preferred implementation the spherical signal point 512 corresponding to the graph vertex 510, and each of the spherical signal points 517, 522, 527, 532, and 537, corresponding to each neighbor graph vertex 515, 520, 525, 530, and 535, belong to the plane. In a still more preferred implementation the product of each neighbor rotation matrix 516, 521, 526, 531, and 536 times the spherical signal point 512 corresponding to the graph vertex 510 is equal to the spherical signal point 517, 522, 527, 532, and 537, of to the corresponding neighbor graph vertex 515, 520, 525, 530, and 535, respectively.

Figure 6:
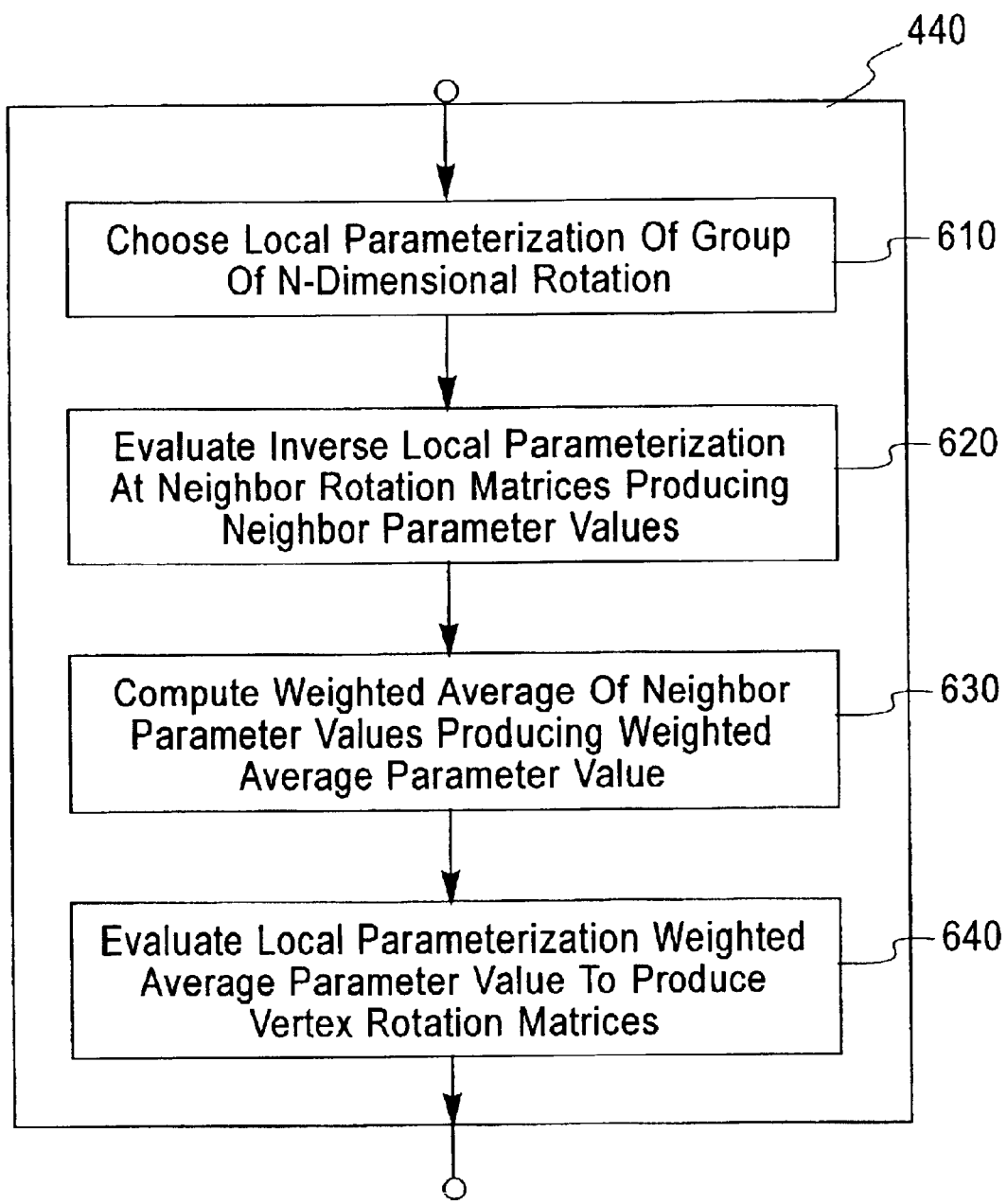
FIG. 6 is a flow chart showing the steps of a preferred embodiment of a step of the flow chart of FIG. 4, where each vertex rotation matrix is evaluated as the weighted average of neighbor rotation matrices with neighbor weights, using a local parameterization of the group on N-dimensional rotations.
Figure 7:
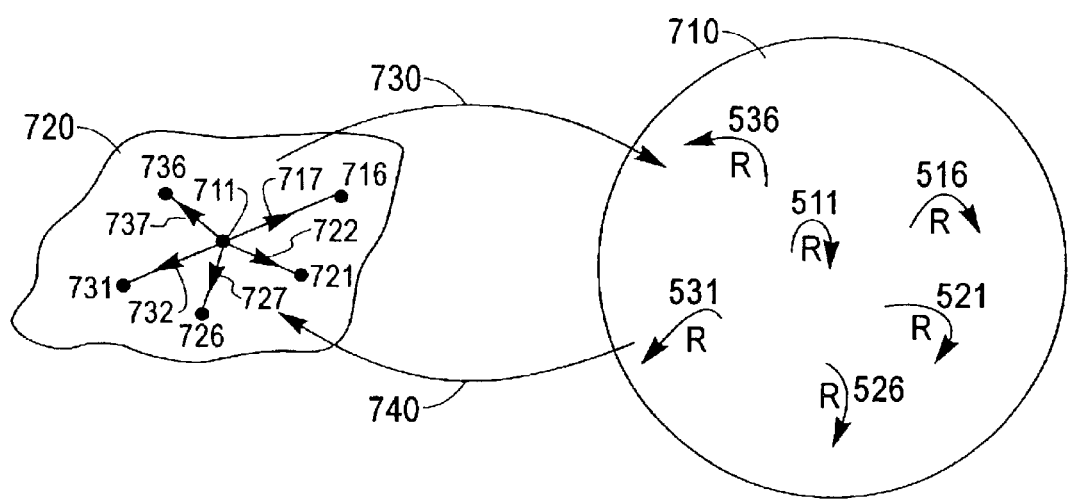
FIG. 7 is a diagram showing a local parameterization of the group on N-dimensional rotations, with local parameter space as the domain of the local parameterization, and inverse local parameterization 740.

FIG. 6 is a flow chart showing the steps of a preferred embodiment of step 440, where each vertex rotation matrix 511 is evaluated as the weighted average of neighbor rotation matrices 516, 521, 526, 531, and 536 with neighbor weights 518, 523, 528, 533, and 538, using a local parameterization of the group on N-dimensional rotations. FIG. 7 is a diagram showing a local parameterization 730 of the group on N-dimensional rotations 710, with local parameter space 720 as the domain of the local parameterization 730, and inverse local parameterization 740. The local parameterization 730 with inverse local parameterization 740 is chosen in step 610 of FIG. 6. The weighted averaging and scaling of the neighbor rotation matrices 516, 521, 526, 531, and 536, is done in the domain 720 of the local parameterization 730. In step 620 a neighbor parameter value 716, 721, 726, 731, and 736, is computed for each of the neighbor rotation matrices 516, 521, 526, 531, and 536, respectively, by evaluating the inverse local parameterization 740 at the neighbor rotation matrices 516, 521, 526, 531, and 536, respectively. In step 630 a weighted average parameter value 711 is computed as the sum of a plurality of weighted neighbor parameter values 717, 722, 727, 732, and 737, each weighted neighbor parameter value corresponding to one of the neighbor vertices 515, 520, 525, 530, and 535, respectively, each weighted neighbor parameter value 717, 722, 727, 732, and 737 being equal to the product of the neighbor weights 518, 523, 528, 533, and 538, times the neighbor parameter values 716, 721, 726, 731, and 736, respectively. In step 640 the local parameterization 730 is evaluated at the weighted average parameter value 711 to produce the vertex rotation matrix 511. This approach is stable, robust, and guaranteed to produce a graph signal composed of equal length signal points. Also, by carefully choosing the local parameterization of the group of rotations, the evaluation of this operator is as efficient as the classical Laplacian operator. In a preferred embodiment the local parameterization is the exponential map parameterization. In another preferred embodiment the local parameterization is the Quaternions parameterization. In another preferred embodiment the local parameterization is Cayley's rational parameterization.

Figure 8:
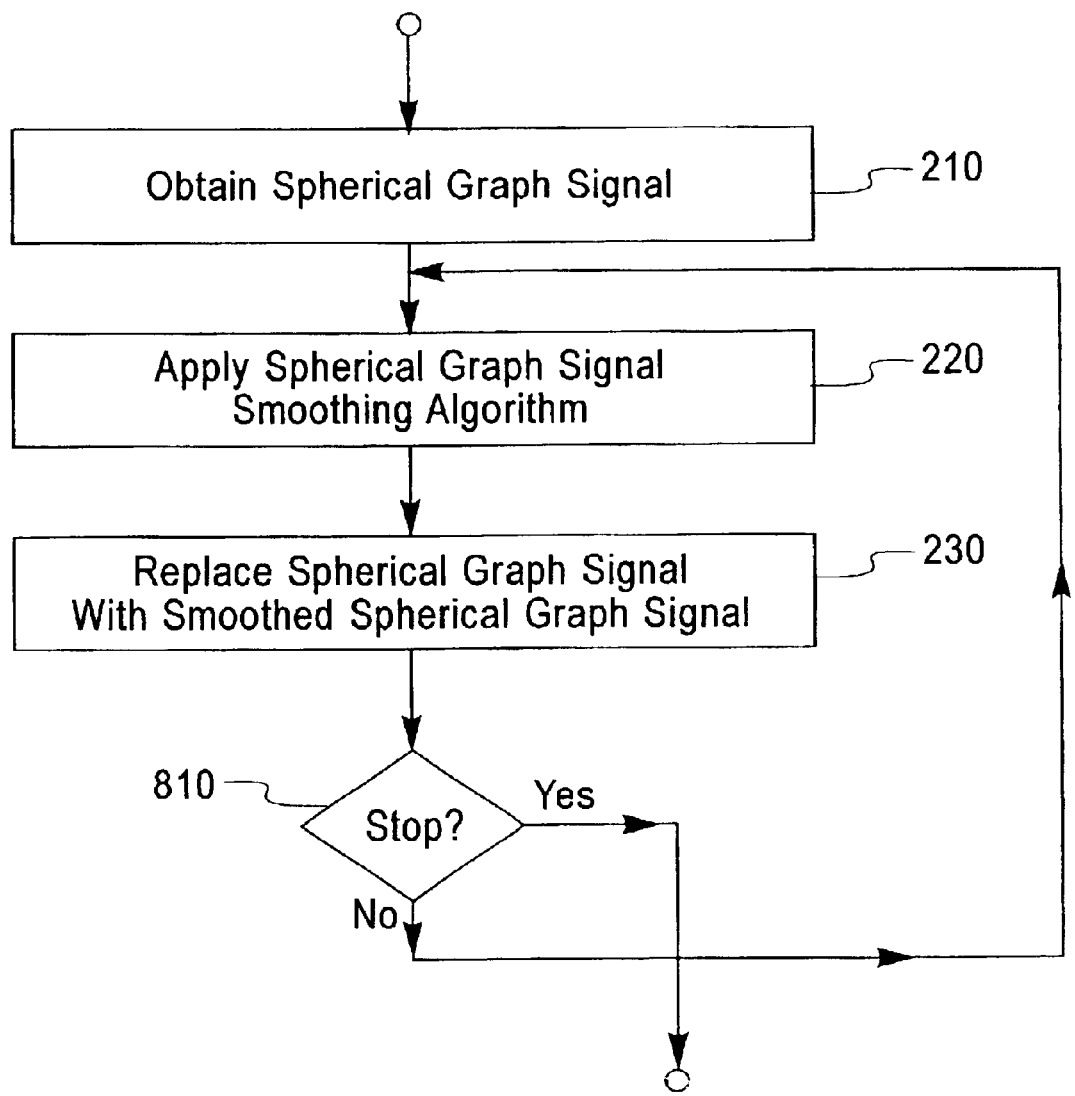
FIG. 8 is a flow chart of a preferred embodiment of the spherical graph signal smoothing method of FIG. 2, where two steps are repeated until a spherical smoothing stopping criterion is met.

FIG. 8 is a flow chart of a preferred embodiment of method 200, where steps 220 and 230 are repeated until a spherical smoothing stopping criterion 810 is met. In a more preferred embodiment the spherical smoothing criterion is a maximal error tolerance. In another more preferred embodiment the spherical smoothing criterion is a maximal number of iterations. In another more preferred embodiment the spherical smoothing criterion is a combination of a maximal error tolerance and a maximal number of iterations.

Figure 9:
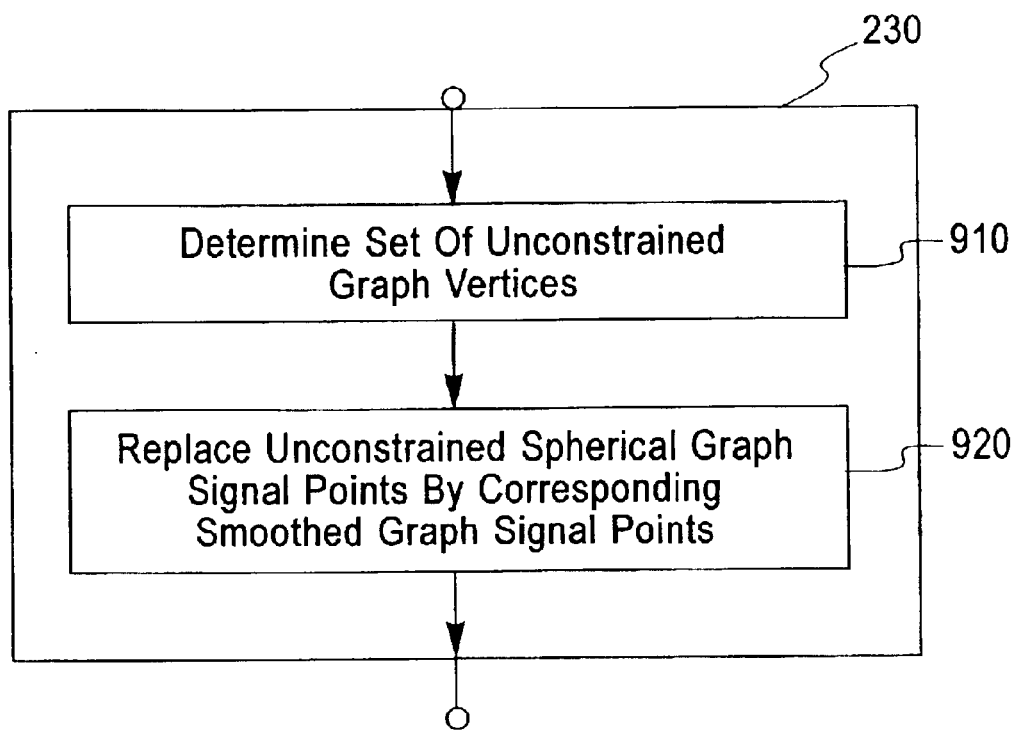
FIG. 9 is a flow chart of a preferred implementation of a step of the spherical graph signal smoothing method of FIG. 2, where constraints are applied.

FIG. 9 is a flow chart of a preferred implementation of step 230 of method 220, where constraints are applied. In step 910 a set of unconstrained graph vertices is determined.

Each unconstrained graph vertex being one particular graph vertex of the graph. In step 920 each spherical signal point corresponding to one unconstrained graph vertex is replaced by the corresponding smoothed spherical graph point. In this preferred embodiment the spherical signal points corresponding to graph vertices not belonging to the set of unconstrained graph vertices are not modified in step 230.

Figure 10:
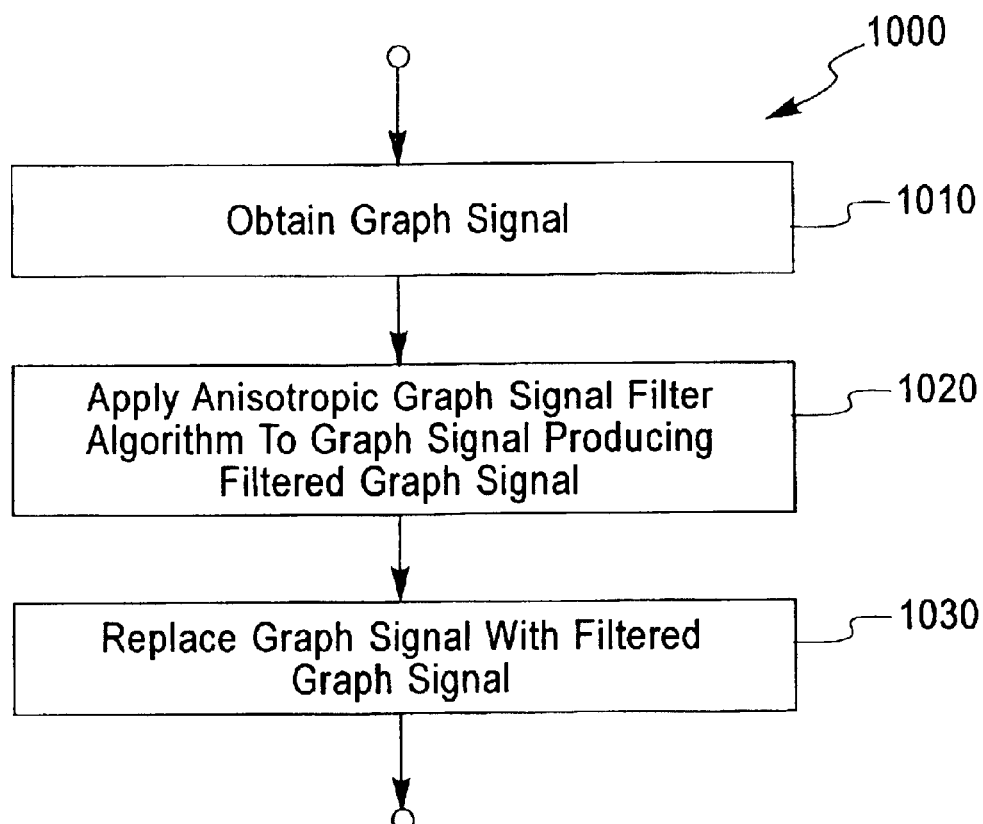
FIG. 10 is a flow chart of an anisotropic graph signal filtering method 1000.

FIG. 10 is a flow chart of an anisotropic graph signal filtering method 1000, which applies to a graph signal producing a filtered graph signal. The graph signal is composed signal points, with each signal point corresponding to one graph vertex of a graph. The filtered graph signal is composed of filtered signal points, with each filtered signal point corresponding to one graph vertex of the graph. In step 1010 the graph signal is obtained. In step 1020 the anisotropic graph signal filter algorithm is applied to the graph signal producing the filtered graph signal. In step 1030 the graph signal is replaced by the filtered graph signal.

Figure 11:
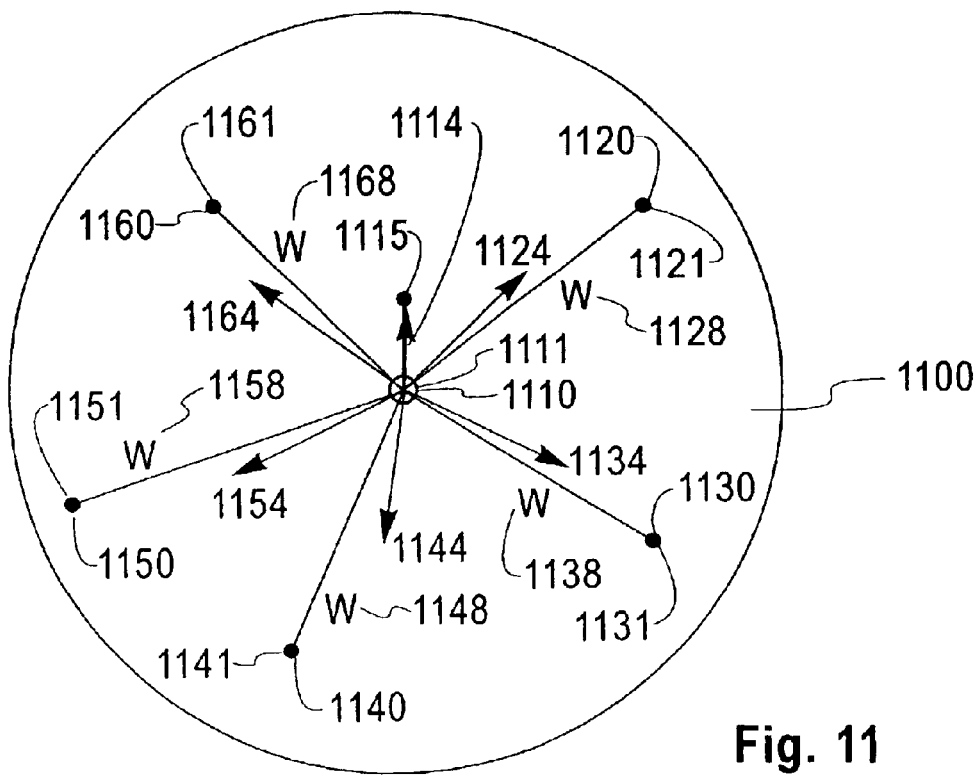
FIG. 11 is a diagram showing the vertex neighborhood of a graph vertex of the graph.

FIG. 11 is a diagram showing the vertex neighborhood 1100 of a graph vertex 1110 of the graph. One signal point 1111, 1121, 1131, 1141, 1151, and 1161 of the graph signal corresponds to each graph vertex 1110, 1120, 1130, 1140, 1150, and 1160, respectively, of the graph. The vertex neighborhood 1100 is composed of neighbor vertices 1120, 1130, 1140, 1150, and 1160.

Figure 12:
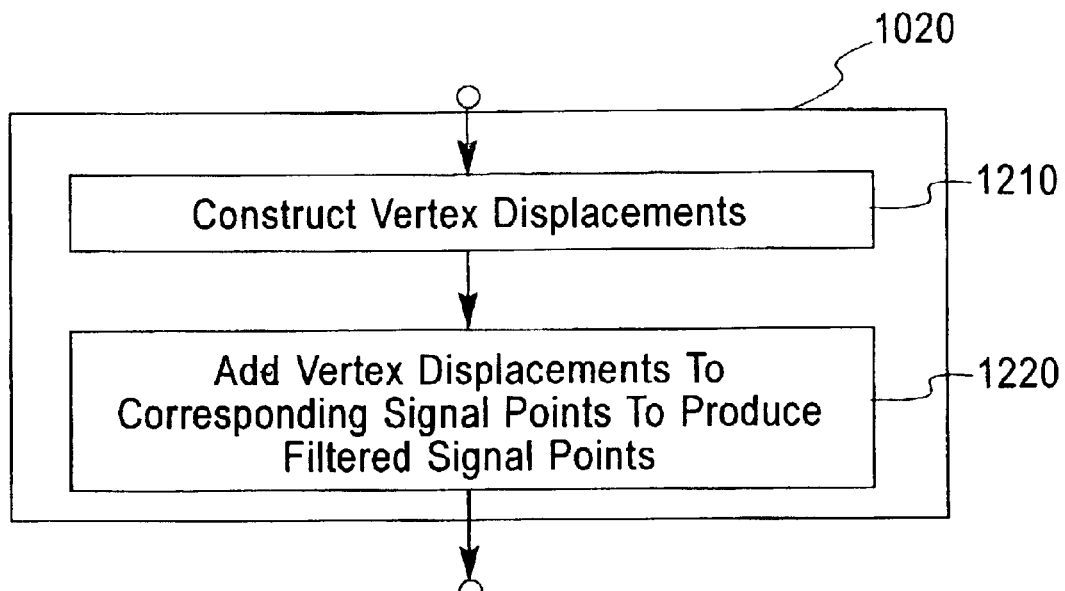
FIG. 12 is a flow chart of a preferred embodiment of a step of the anisotropic graph signal filtering method of FIG. 10, where the filtered vertex displacements are constructed.

FIG. 12 is a flow chart of a preferred embodiment of step 1020 of method 1000. In step 1210 a vertex displacement 1111 is constructed for each of the graph vertices 1110 of the graph, the vertex displacement being a vector in the N-dimensional space. In step 1220 the vertex displacement 1114 is added to the corresponding signal point 1111 to produce a corresponding filtered signal point 1115 of the filtered graph signal.

Figure 13:
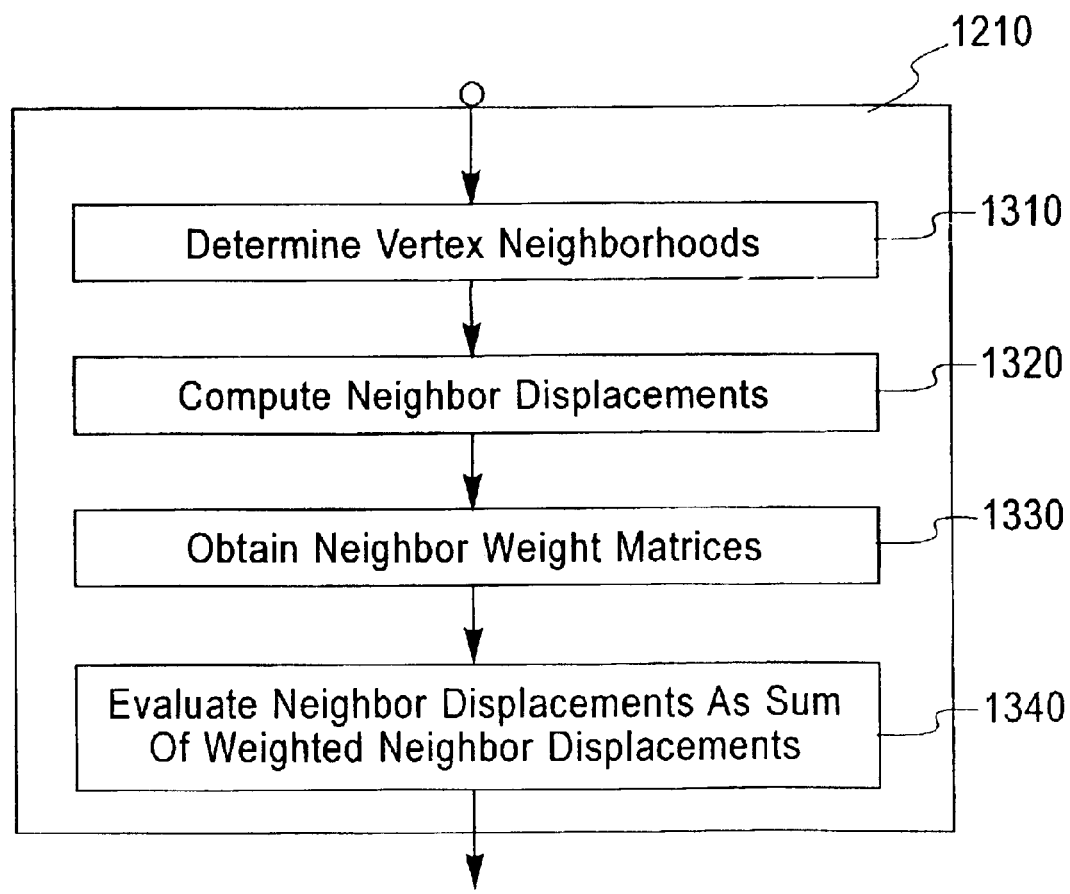
FIG. 13 is a flow chart of a preferred embodiment of a step of the flow chart of FIG. 12, where vertex displacements are constructed.

FIG. 13 is a flow chart of a preferred embodiment of step 1210. In step 1310 a vertex neighborhood 1100 is determined for each graph vertex 1110 of the graph. In step 1320 a neighbor displacement 1124, 1134, 1144, 1154, and 1164, is computed for each neighbor graph vertex 1120, 1130, 1140, 1150, and 1160, respectively, in the neighborhood 1100 of the vertex 1110. Each of the neighbor displacements 1124, 1134, 1144, 1154, and 1164, is a vector in N-dimensional space computed by subtracting the signal point 1111 corresponding to the graph vertex 1110 from the signal point 1121, 1131, 1141, 1151, and 1161, respectively, corresponding to a neighbor graph vertex 1120, 1130, 1140, 1150, and 1160, respectively. In step 1330 a plurality of neighbor weight matrices is obtained. The neighbor weight matrices are matrices with N rows and N columns. Each neighbor weight matrix 1128, 1138, 1148, 1158, and 1168, corresponds to one of the neighbor graph vertices 1120, 1130, 1140, 1150, and 1160, respectively. In step 1340 the neighbor displacements are evaluated. Each neighbor displacement 1114 evaluated as the sum of a plurality of weighted neighbor displacements. Each weighted neighbor displacement being equal to the product of one neighbor weight matrix 1128, 1138, 1148, 1158, and 1168, times a corresponding neighbor displacement 1124, 1134, 1144, 1154, and 1164, respectively. In a preferred embodiment the degree of anisotropy is controlled using neighbor weight matrices computed as affine combinations of the neighbor weight matrices obtained in step 1330 and scalar weights.

Figure 14:
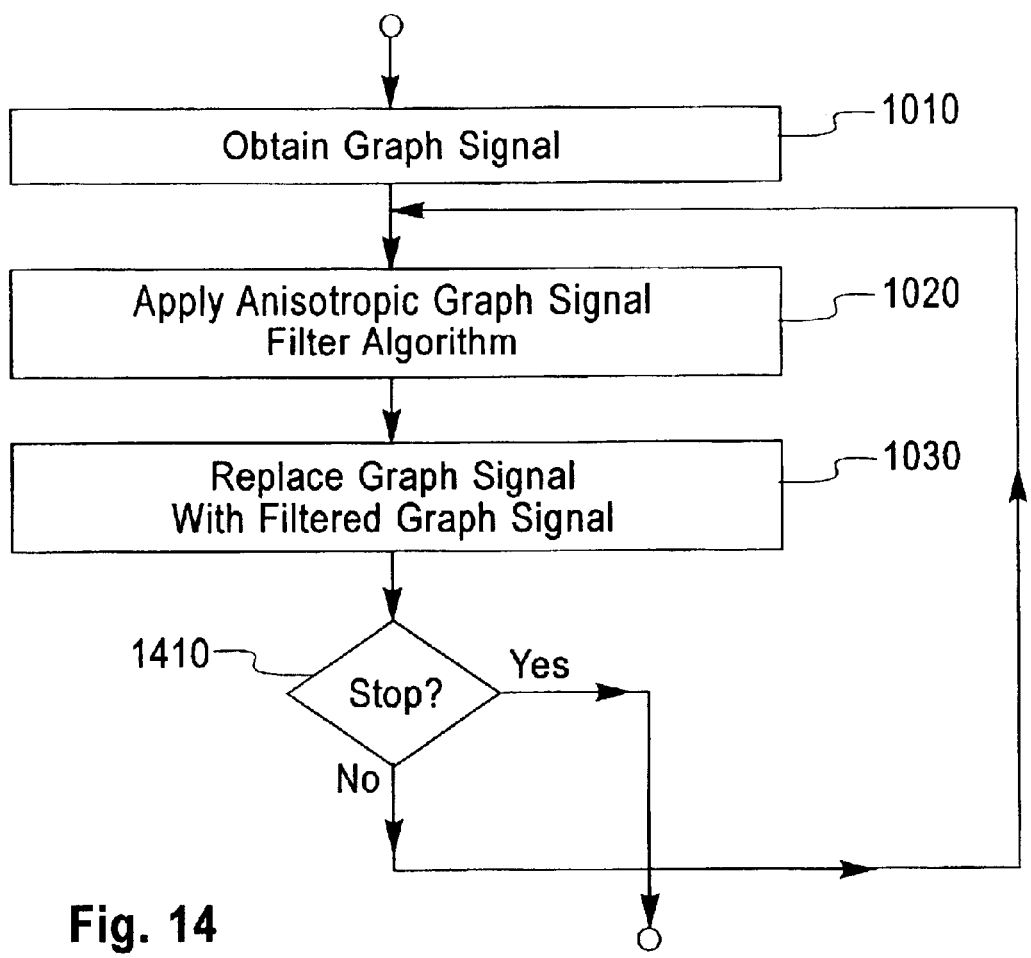
FIG. 14 is a flow chart of a preferred embodiment of the anisotropic graph signal filtering method of FIG. 10, where two steps are repeated until an anisotropic filtering stopping criterion is met.

FIG. 14 is a flow chart of a preferred embodiment of method 1000, where steps 1020 and 1030 are repeated until an anisotropic filtering stopping criterion 1410 is met. In a more preferred embodiment the anisotropic filtering stopping criterion is a maximal error tolerance. In another more preferred embodiment the anisotropic filtering stopping criterion is a maximal number of iterations. In another more preferred embodiment the anisotropic filtering stopping criterion is a combination of a maximal error tolerance and a maximal number of iterations.

Figure 15:
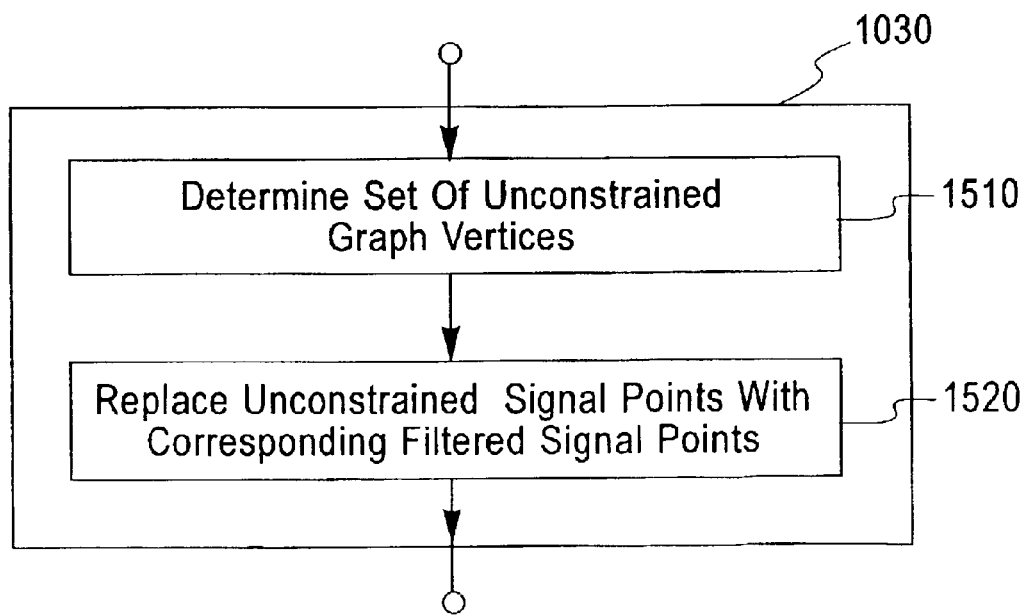
FIG. 15 is a flow chart of a preferred implementation of a step of the anisotropic graph signal filtering method of FIG. 10, where constraints are applied.

FIG. 15 is a flow chart of a preferred implementation of step 1030 of method 1000, where constraints are applied. In step 1510 a set of unconstrained graph vertices is determined. Each unconstrained graph vertex being one particular graph vertex of the graph. In step 1520 each signal point corresponding to one unconstrained graph vertex is replaced by the corresponding filtered graph point. In this preferred embodiment the signal points corresponding to graph vertices not belonging to the set of unconstrained graph vertices are not modified in step 1530.

Figure 16:
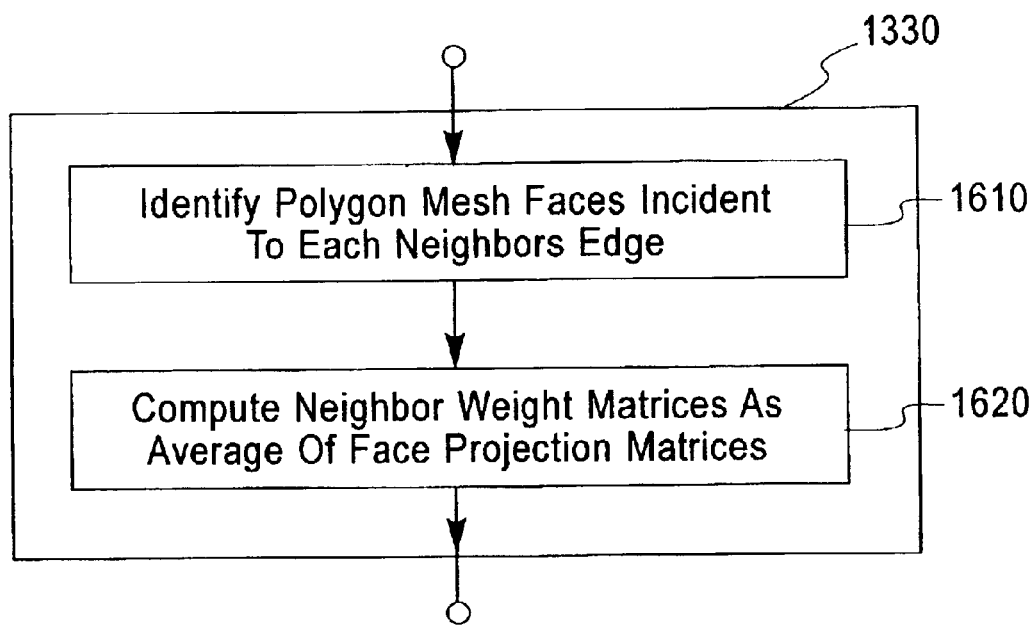
FIG. 16 is flow chart of a preferred implementation of a step of the flow char to FIG. 13, where the neighbor weight matrices, with a graph signal obtained as a vertex positions signal of a polygon mesh.
Figure 17:
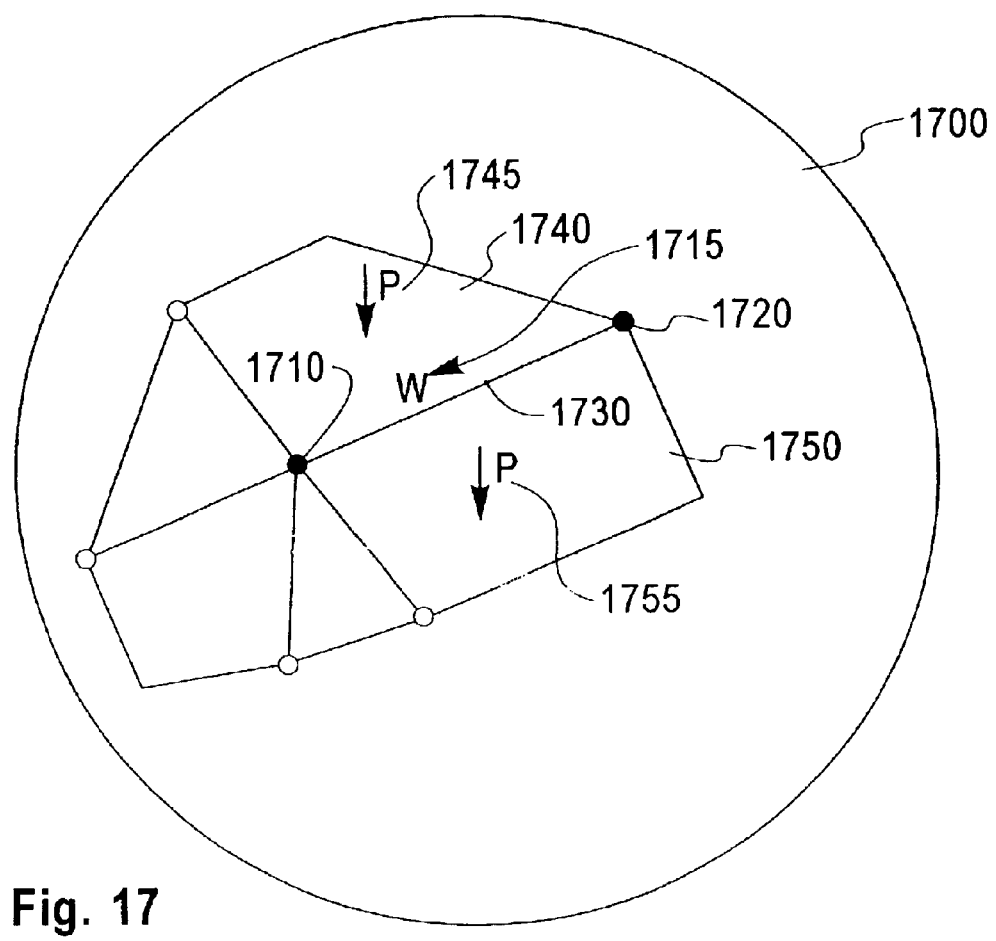
FIG. 17 is a diagram showing a neighborhood of a polygon mesh vertex of the polygon mesh.

FIG. 16 is flow chart of a preferred implementation of step 1330, where the graph signal obtained in step 1010 of method 1000 is a vertex positions signal of a polygon mesh. The polygon mesh having a polygon mesh connectivity and a face normals signal, in addition to the vertex positions signal, and the graph being the primal graph of the polygon mesh. FIG. 17 is a diagram showing a neighborhood 1700 of a polygon mesh vertex 1710 of the polygon mesh. In step 1610 a set of polygon mesh faces 1740 and 1750 incident to each neighbor edge 1730 is identified. The neighbor edge 1730 being a graph edge, the graph edge having the graph vertex 1710 and the neighbor graph vertex 1720 as ends, the set of polygon mesh faces containing one or more edge polygon mesh faces 1740 and 1750, each edge polygon mesh face being a polygon mesh face incident to the neighbor edge 1730. In step 1620 the neighbor weight matrix 1715 is obtained as the average of a set of projection matrices 1745 and 1755, each projection matrix in the set of projection matrices being a matrix with N rows and N columns, each projection matrix 1745 and 1755 in the set of projection matrices corresponding to one particular polygon mesh face 1740 and 1750, respectively, in the set of polygon mesh faces, each projection matrix 1745 and 1755 in the set of projection matrices representing the orthogonal projection onto a face plane, the face plane being a plane in N-dimensional space.

Figure 18:
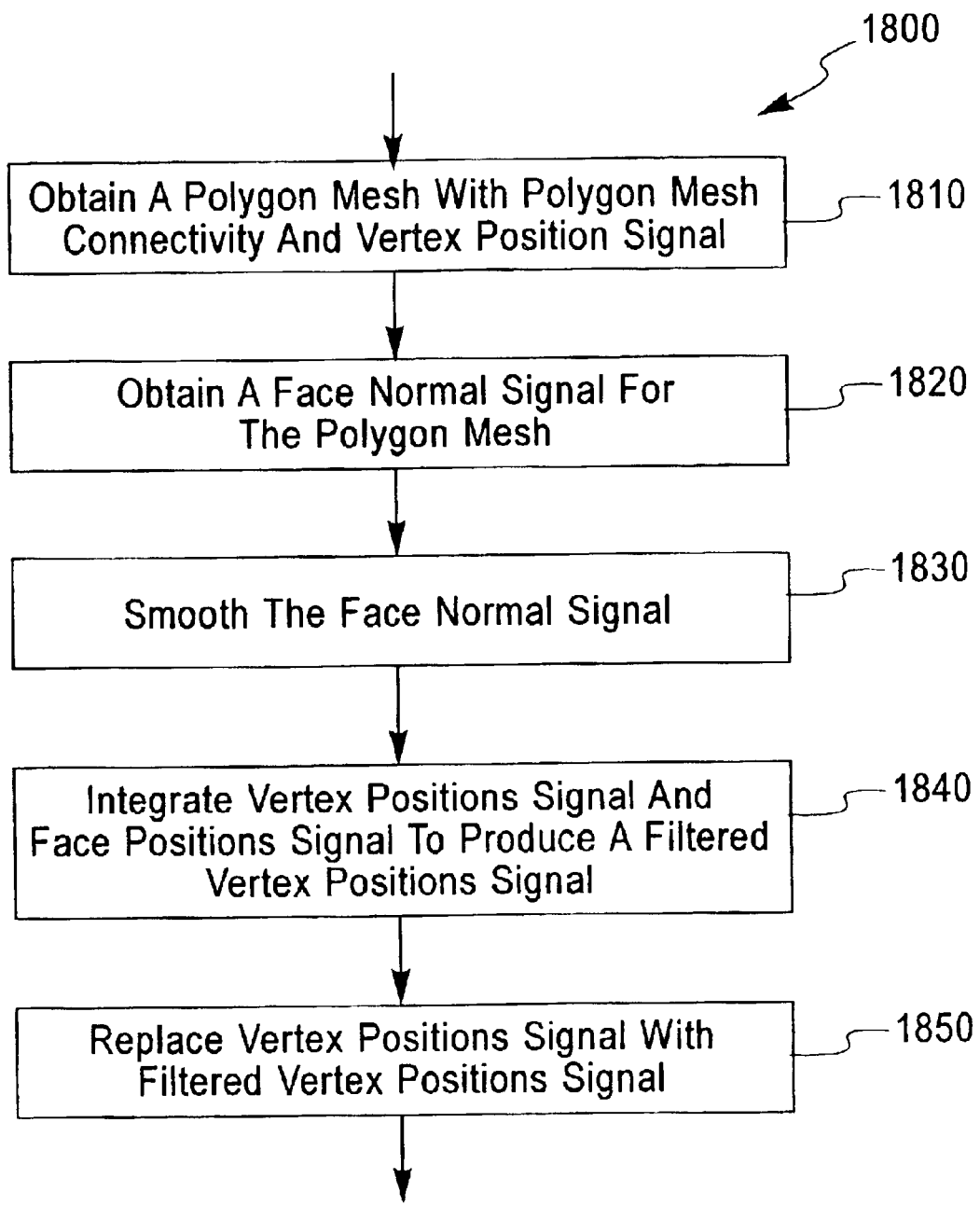
FIG. 18 is a flow chart of a polygon mesh denoising method to denoise the vertex positions of a polygon mesh without tangential drift.

FIG. 18 is a flow chart of a polygon mesh denoising method 1800 to denoise the vertex positions of a polygon mesh without tangential drift. In step 1810 the polygon mesh is obtained, the polygon mesh including a polygon mesh connectivity and a vertex positions signal, the vertex positions signal including a plurality of vertex positions, each vertex position corresponding to one polygon mesh vertex of the polygon mesh. In step 1820 a face normals signals for the polygon mesh is obtained, the face normals signals including a plurality of face normals, each face normal corresponding to a polygon mesh face of the polygon mesh. The face normals signal is a spherical signal on the dual graph of the polygon mesh. In step 1830 the face normals signal is smoothed using method 200 for smoothing spherical graph signals of this invention. In step 1840 the vertex positions signal are filtered using method 1000 of this invention with the preferred implementation of step 1330, producing a filtered vertex positions signal. described in FIG. 16. In this step the smoothed face normals are used to construct neighbor weight matrices on the primal graph of the polygon mesh. Each neighbor weight matrix corresponds to a neighbor polygon mesh vertex that belongs to the vertex star of one polygon mesh vertex. In a preferred implementation each neighbor weight matrix is computed as the average of the face projection matrices corresponding to the faces incident to the primal graph edge defined by the polygon mesh vertex and the neighbor polygon mesh vertex, the primal graph edge associated with the neighbor weight matrix, each of the face projection matrices being an orthogonal projection matrix onto the plane supporting the corresponding polygon mesh face. Finally, in step 1850 the vertex positions signal is replaced with the filtered vertex positions signal.

In a preferred implementation the face normal signal is obtained in step 1820 from the same source as the polygon mesh connectivity and the vertex positions signal.

In another preferred implementation the face normal signal is computed as a function of the vertex positions signal.

Figure 19:
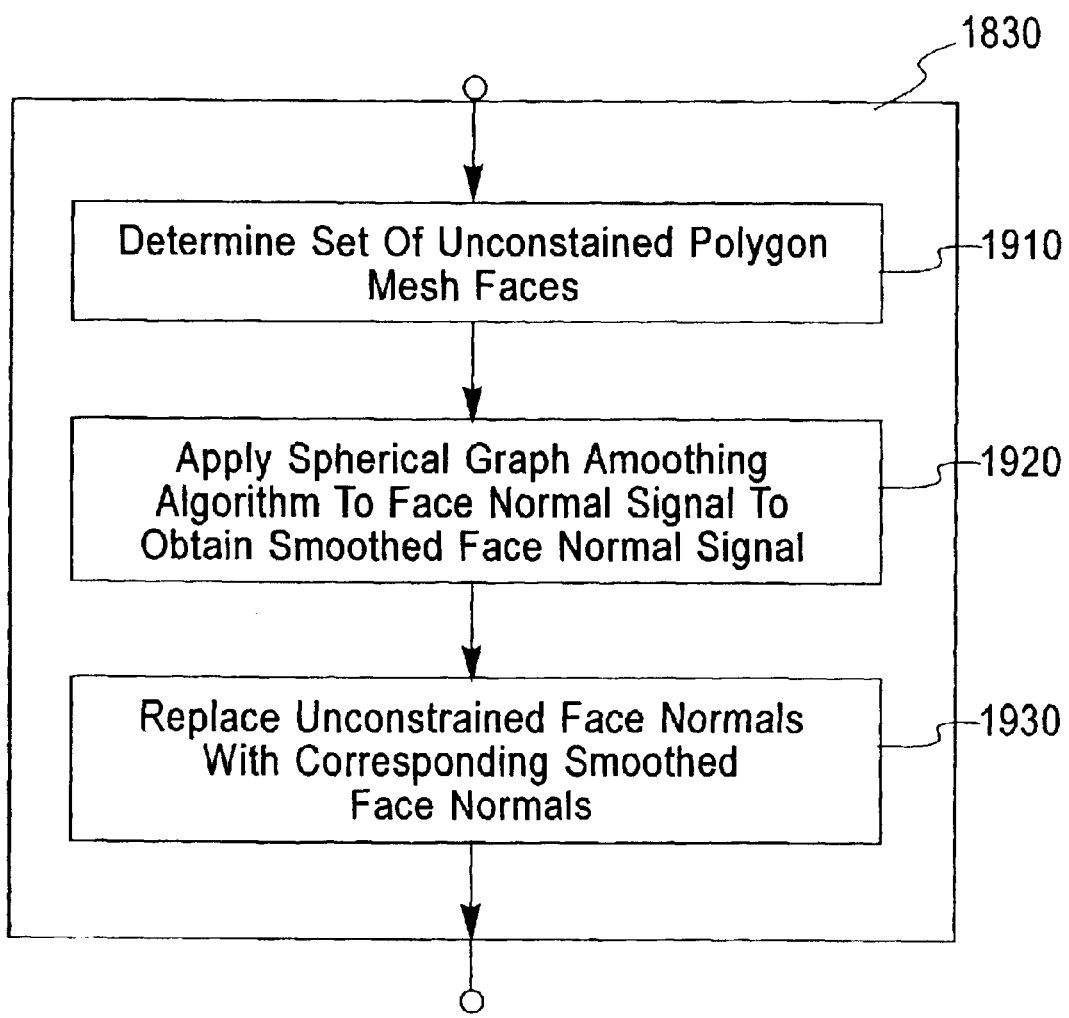
FIG. 19 is a flow chart of a preferred implementation of a step of the polygon mesh denoising method of FIG. 18 where face normal constraints are applied.

FIG. 19 is a flow chart of a preferred implementation of step 1830 of method 1800, where face normal constraints are applied. In step 1910 a set of unconstrained polygon mesh faces is determined. Each unconstrained polygon mesh face being one particular polygon mesh face of the polygon mesh connectivity. Step 1920 is the same as step 220, where the spherical graph signal equal of step 220 is the face normals signal and the graph of step 220 is the dual graph of the polygon mesh. In step 1930 each face normal corresponding to one unconstrained polygon mesh face is replaced by the corresponding smoothed polygon mesh face. In this preferred embodiment the face normals corresponding to polygon mesh faces not belonging to the set of unconstrained polygon mesh faces are not modified in step 1930.

Figure 20:
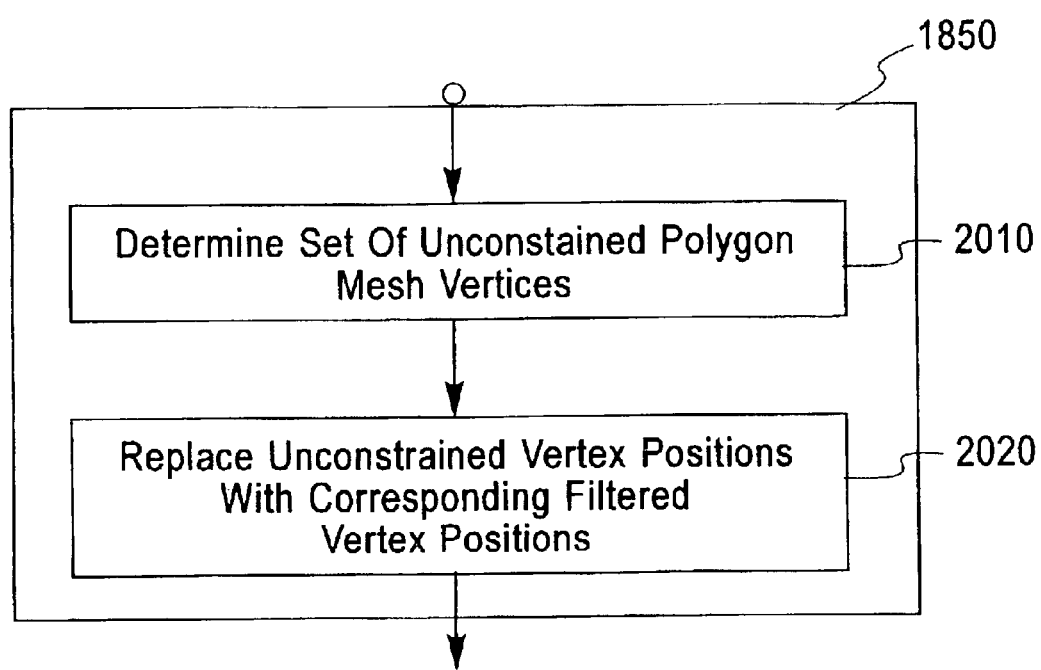
FIG. 20 is a flow chart of a preferred implementation of a step of the polygon mesh denoising method of FIG. 18 where vertex position constraints are applied.

FIG. 20 is a flow chart of a preferred implementation of step 1850 of method 1800, where vertex position constraints are applied. In step 2010 a set of unconstrained polygon mesh vertices is determined. Each unconstrained polygon mesh vertex being one particular polygon mesh vertex of polygon mesh connectivity. In step 2020 each vertex position corresponding to one unconstrained polygon mesh vertex is replaced by the corresponding filtered vertex position. In this preferred embodiment the vertex positions corresponding to polygon mesh vertices not belonging to the set of unconstrained polygon mesh vertices are not modified in step 2020.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. Thus the invention may be implemented by apparatus implementing the steps of any method herein. The described embodiments ought to be construed to be merely illustrative of some of the more prominent features and applications of the invention. Other beneficial results can be realized by applying the disclosed invention in a different manner or modifying the invention in ways known to those familiar with the art.

An overview, expansion and mathematical details of the invention are given in the following discussion. All publications referenced herein are incorporated by reference in entirety for all purposes.

1 Overview

The problem of smoothing or denoising large irregular polygon meshes of arbitrary topology, such as those extracted from volumetric medical data by iso-surface construction algorithms, or constructed by integration of multiple range images, has motivated most of the recent work in geometric signal processing [19].

1.1 Previous Work

Because of the size of the typical data sets, only linear time and space algorithms can be considered, particularly for applications such as surface design and mesh editing, where interactive rates are a primary concern. The simplest smoothing algorithm that satisfies the linear complexity requirement is Laplacian smoothing, a well established iterative algorithm introduced in the mesh generation literature to improve the quality of meshes used for finite element computations [5, 8]. In this context boundary vertices of the mesh are constrained not to move, but internal vertices are simultaneously moved in the direction of the barycenter of their neighboring vertices. And then the process is iterated a number of times.

Figure 22A:
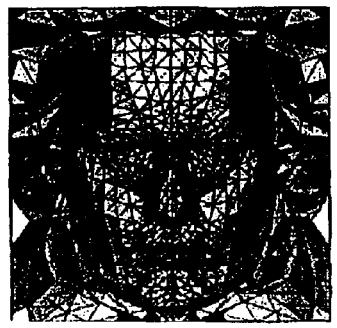
FIG. 22 shows Laplacian vs. Taubin smoothing. FIR Filters based on the linear isotropic Laplacian operator. (A) Noisy mesh. (B) Result of Laplacian smoothing (10 steps with A=0.6307). (C) Result of Taubin Smoothing (10 steps with A1=0.6307 and A2=—0.6732).
Figure 22B:
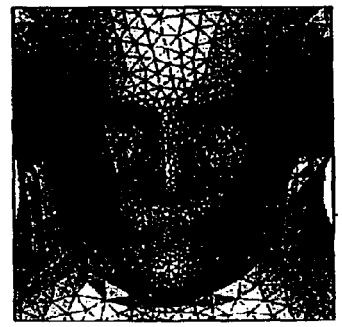
Figure 22C:
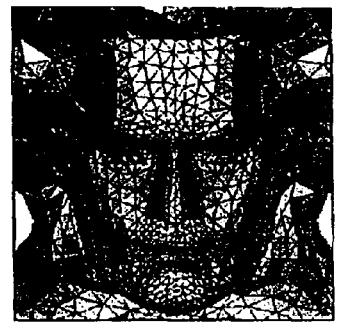

Laplacian smoothing is not problem-free, though. When Laplacian smoothing is applied to a noisy 3D polygon mesh without constraints, noise is removed, but significant shape distortion may be introduced. This problem is called shrinkage. When a large number of Laplacian smoothing steps are iteratively performed, the shape undergoes significant deformations, eventually converging to the centroid of the original data. The $\lambda/\mu$ algorithm introduced by Taubin [18] solves the shrinkage problem with a simple alternating sign modification that converts the Laplacian smoothing algorithm into a low-pass filter. FIG. 22 shows the result of smoothing a noisy mesh with Laplacian and Taubin smoothing. In both cases the algorithms perform exactly the same number of operations. In the same paper, Taubin introduced Fourier Analysis on mesh signals as a tool to understand and predict the behavior of these linear smoothing processes [18]. This work was followed by a number of extensions, improvements, applications, and closely related algorithms, which addressed the following existing and/or open problems with mesh filters to some extent: enhancement and prevention of tangential drift, boundary and crease curve detection and enhancement, and introduction and intuitive control of position and normal constraints.

Taubin et.al. [21] introduced efficient and robust algorithms to evaluate any finite impulse response (FIR) linear filter on mesh signals. Zorin et.al. [24] showed an application to multiresolution interactive shape design. Kuriyama and Tachibana [13] used an anisotropic diffusion mechanism to generate smooth interpolatory subdivision surfaces with vertex position and normal constraints, and tension control. Hausler and Karbacher [9, 10] describe a non-linear method for smoothing polygon meshes based on circular arc approximations. Kobbelt et.al. [11, 12] introduced a multiresolution approach to denoising and shape design based on linear filters and constrained minimization. Desbrun et. al. [4] addressed the tangential drift problem observed in meshes with irregular edge length and angle distribution with a non-linear Laplacian operator and an infinite impulse response (IIR) filter with rational transfer function. And more recently, several authors [3, 15, 2, 14] have proposed closely related non-linear algorithms that extend to meshes the anisotropic diffusion approach to image segmentation introduced by Perona and Malik [16].

The ability to impose constraints to the smoothing process, such as specifying the positions of some vertices, or normal vectors, specifying ridge curves, or the behavior of the smoothing process along the boundaries of the mesh, is needed in the context of free-form interactive shape design. Taubin [18] shows that by modifying the neighborhood structure certain kind of constraints can be imposed without any modification of the algorithm, while other constraints that require minor modifications and the solution of small linear systems. Bierman et.al. [1] show how to construct subdivision surfaces with vertex normal constraints. Kobbelt et. al. [11, 12] formulate the problem as an energy minimization problem, and solve it efficiently with a multiresolution approach on levels of detail hierarchies generated by decimation. Kuriyama [13] and Yamada et. al. [23] introduced soft vertex normal constraints trough a spring-based approach, but report slow convergence.

1.2 Contributions

In this paper we present a simpler and unified solution to some of the problems listed above based on new modifications of the Laplacian smoothing algorithm and the closely related FIR linear filters. As a first contribution we introduce an anisotropic Laplacian operator in which the weighting of displacements to neighboring vertices is given by matrices. These matrices defined on the vertices of the mesh can be regarded as a discrete tensor field. In the classical isotropic Laplacian operator the weights are scalars. To prevent tangential drift we compute the weights as functions of a field of face normals, in such a way that the resulting Laplacian smoothing algorithm integrates the face normals in the least squares sense. Other anisotropic Laplacian operators can be constructed to produce different effects, but we will not study them here.

If the field of face normals is smooth, a linear low-pass filter based on this anisotropic Laplacian operator removes noise while preventing tangential drift. Since computing face normals from noisy data produces much noisier face normal fields, we need to smooth the field of face normals before using it to generate the anisotropic weights for the vertex position smoothing process. As a second contribution we introduce an algorithm to evaluate FIR linear filters on signals defined on graphs and with values in the unit sphere. We then apply this algorithm to a field of face normals defined on the dual graph of a mesh. Again, our algorithm is Laplacian smoothing with a properly defined Laplacian operator for unit-length vector signals.

In our algorithm for denoising without tangential drift the face normals are first filtered independently of the vertex positions. Then the matrix weights of the linear anisotropic Laplacian operator are computed, and finally the vertex positions are filtered using the resulting linear anisotropic filter with constant weights. This algorithm is related to the non-linear anisotropic diffusion crease-enhancing algorithm introduced by Ohtake et.al. [15, 14], where a non-linear coupled diffusion process is introduced to simultaneously process face normals and vertex positions. But here the two processes are decoupled. We filter the face normals independently of the vertex positions, and then, as in the linear isotropic case, we compute the weights once and keep them fixed during the vertex position filtering process.

In the now classical Laplacian smoothing algorithm and its derivatives, imposing interpolatory vertex position constraints is easy, but imposing interpolatory normal constraints is not. In our new algorithm both kinds of interpolatory constraints are easy to apply. Interpolatory face normal constraints are imposed as in the classical case by not moving the constrained face normals in the direction determined by the Laplacian operator. Similarly, the constrained vertices are not moved in the second phase of the algorithm.

1.3 Paper Organization

The paper is organized as follows. In section 2 we basic mesh signal processing concepts and establish some notation. In section 3 we define the different types of Laplacian operators: linear, non-linear, isotropic, and anisotropic. In section 4 we extend the Fourier Analysis of mesh signals [18] to the linear anisotropic case, and in section 5 we review the design of linear filters. In section 6 we describe a solution of the boundary shrinkage problem of classical Laplacian smoothing as a motivation for the algorithm introduced in this paper. In section 7 we describe the existing non-linear isotropic solutions to the tangential drift problem, and our new linear anisotropic solution. In section 8 we define an isotropic Laplacian operator for signals with values on the unit sphere, which allows us to extend the Laplacian smoothing algorithm to these signals. In section 9 we review the formulation of Rodrigues formula required in the previous section. In section 10 we determine integrability conditions for vector fields defined on the faces of a mesh, we formulate an orthogonal decomposition theorem, and show that our algorithm integrates the field of face normals in the least squares sense. In section 11 we show some experimental results, and we discuss applications and extensions of our algorithm, other than denoising.

2 Mesh Signals

A graph G, composed of a set of vertices V, and a set of edges E can be directed or undirected. In addition to vertices and edges, a polygon mesh M includes a set of faces F. For simplicity, we only consider faces defined as cycles of vertices. The undirected graph of a mesh M is composed of the set of mesh vertices and the set of mesh edges as unordered pairs. In the directed case, where the edges of G are ordered pairs of vertices, every edge of M corresponds to two oriented edges of G. We use the symbols V, E, and F not only to denote the sets of vertices, edges, and faces, but also for the number of vertices, edges, and faces. The correct meaning can always be deduced from the context.

In this paper we look at the vertices of M in two ways. One way is as a three-dimensional graph signal $x=(x_1, \ldots, x_v)^t$ defined on G. In general, a D-dimensional graph signal on a graph G is a D×V matrix $x=(x_1, \ldots, x_v)^t$, where each row of x is regarded as the signal value at the i-th. vertex of the graph. We are mainly interested in the cases D=1 and D=3. The other way we look at a D-dimensional graph signal on a graph G is as a D×V column vector x constructed concatenating the V vectors $x_1, \ldots, x_v$ of dimension D on top of each other.

In this paper we will also look at the face normals of M as a graph signal on the dual graph of M and with values in the unit sphere, and more generally on vector fields of arbitrary dimensionality defined on the faces of the mesh.

The edges of M are classified as boundary, regular, or singular depending on the number of incident faces. A boundary edge has one incident face, a regular edge has two incident faces, and a singular edge has three or more incident faces. The dual graph of M has the faces of M as vertices, and the regular edges of M as edges. The boundary faces of M are those incident to one or more boundary edges.

A neighborhood or star of a vertex index i in the graph G is the set i* of vertex indices j connected to i by an edge (i, j).

$$i^* = \{j : (i,j) \in E\}.$$

If the index j belongs to the neighborhood i*, we say that j is a neighbor of i. The neighborhood structure of an undirected graph, such as the graph of a mesh defined above, are symmetric. That is, a vertex j is a neighbor of a vertex i, if and only if i is a neighbor of j.

3 Anisotropic Laplacian Operator

The Laplacian operator can be isotropic or anisotropic, and independently linear or non-linear. The four combinations are possible. As Weickert points out [22], sometimes in the image processing literature a filter that we would call non-linear isotropic, is called anisotropic. This is also the case in some of the recent work on anisotropic mesh processing [4, 2, 15, 14]

In this paper the isotropic Laplacian operator is defined on a graph signal x with values in Euclidean space by weighted averages over the neighborhoods $$\Delta x_i = \sum_{j \in i^*} w_{ij} (x_j - x_i), \qquad (1)$$

where the edge weights $w_{ij}$ are non-negative scalars that add up to one for each vertex star $$\sum_{j \in i^*} w_{ij} = 1. \qquad (2)$$

One way to impose these constraints is to define the weights as normalized edge costs $w_{ij} = c_{ij}/c_i$, where $c_{ij} \geq 0$ is an edge cost, and $c_i = \Sigma_{j \in i^*} c_{ij} > 0$ is a vertex cost equal to the total cost of edges incident to the i-th. vertex. The simplest choice here is to make all the edge costs equal to one $c_{ij}=1$, i.e., to make the weight $w_{ij}$ equal to the inverse of the number of neighbors $1/|i^*|$ of the i-th. vertex. Other non-linear choices of isotropic weights are discussed in section 7.

We define the anisotropic Laplacian operator on a 3D graph signal x also by weighted averages over the neighborhoods $$\Delta x_i = \sum_{j \in i^*} W_{ij} (x_j - x_i), \qquad (3)$$

but here the edge weights $W_{ij}$ are symmetric and non-negative definite 3×3 matrices such that their sum $$\sum_{j \in i^*} W_{ij}$$

has eigenvalues in the interval [0, 1]. One way to construct these weight matrices is as functions of edge and vertex costs, as in the isotropic case. Here the edge costs $C_{ij}$, and the vertex cost $C_i$, are 3×3 symmetric and non-negative definite matrices such that $C_i \geq \Sigma_{j \in i^*} C_{ij}$ as quadratic forms (i.e., such that $\forall x \in \mathbb{R}^3 : x^t C_i x \geq \Sigma_{j \in i^*} x^t C_{ij} x$). For example, if $c_i$ is an upper bound for the eigenvalues of $\Sigma_{j \in i^*} C_{ij}$, we can take $C_i = c_i I$, which is what we have used in our implementation (see section 7). To simplify the formulation, we will also assume that $C_i$ is non-singular, which is true in the previous example, and set $W_{ij} = L_i^{-1} C_{ij} L_i^{-t}$, where $L_i$ is the Cholesky decomposition [7] of $C_i$, i.e. the unique lower triangular matrix such that $L_i L_i^t = C_i$.

Both in the isotropic and anisotropic cases we call the Laplacian operator linear when the weights are constants, and non-linear when the weights are computed as an additional function of the signal values. FIG. 23 describes the algorithm to evaluate the different Laplacian operators defined in this section on a signal x defined on a directed graph G, with given weight matrix W. The isotropic weights discussed in section 7 are all non-linear.

4 Fourier Analysis on Meshes

Fourier analysis can be used to understand and predict the behavior of linear operators [18, 21]. Since the isotropic Laplacian operator $x \mapsto \Delta x$ is linear on the space of graph signals defined on G, and operates independently on each of the coordinates of x, it is sufficient to analyze the case of one-dimensional graph signals. If we define the matrix K=I−W, with I the identity matrix, the isotropic Laplacian operator applied to a graph signal x can be written in matrix form as follows $$\Delta x = -Kx. \qquad (4)$$

For undirected graphs and weights defined by symmetric costs ($c_{ij}=c_{ji}$), the matrix K has real eigenvalues $0 \leq k_1 \leq k_2 \leq \ldots \leq k_V \leq 2$ with corresponding linearly independent real unit length right eigenvectors $e^1, \ldots, e^V$. In matrix form $$KE = ED, \qquad (5)$$

with $E=(e^1, \ldots, e^V)$, $k=(k_1, \ldots, k_V)^t$, and D the diagonal matrix with $k_i$ in its i-th. diagonal position. Seen as one-dimensional graph signals, these eigenvectors can be considered as the natural vibration modes of the graph, and the corresponding eigenvalues as the associated natural frequencies.

Since $e^1, \ldots, e^V$ form a basis of V-dimensional space, every graph signal x can be written as a linear combination $$x = \sum_{j=1}^{V} \hat{x}_j e^j = E\hat{x}. \qquad (6)$$

The vector of coefficients $\hat{x}$ is the Discrete Fourier Transform (DFT) of x, and E is the Fourier Matrix.

The analysis for the anisotropic Laplacian operator is similar, but requires the treatment of the 3 coordinates of the graph signal at once. In this case we look at the signal x not as a matrix but as a 3V-dimensional vector; the matrix K is a V×V block matrix, with each block a 3×3 matrix:

$$K_{ij} = \begin{cases} I - W_{ii} & \text{if } i = j \\ -W_{ij} & \text{if } i \neq j \end{cases}$$

The rest of the analysis is exactly the same as for the isotropic case, except that here K has 3V eigenvalues and eigenvectors, and each eigenvector simultaneously defines the 3 coordinates of all the vertices of the mesh.

5 Mesh Filters

A Linear Filter is defined by a univariate function $f(k)$ that can be evaluated on the square matrix K to produce another matrix $f(K)$ of the same size. Although many functions of one variable can be evaluated in matrices [7], in this paper we only consider polynomials [21]. The function $f(k)$ is the transfer function of the filter.

It is well known that for any of these functions, the matrix $f(K)$ has the eigenvectors $e^1, e^2, \ldots$ of the matrix K as eigenvectors, and the result $f(k_1), f(k_2), \ldots$ of evaluating the function on the eigenvalues of K as eigenvalues.

Since for any polynomial transfer function $$x' = f(K)x = \sum_i f(k_i)\hat{x}_i e^i,$$

because $Ke^i = k_i e^i$, to define a low-pass filter we need to find a polynomial such that $f(k_i) \approx 1$ for low frequencies, and $f(k_i) \approx 0$ for high frequencies in the region of interest $k \in [0, 2]$.

FIG. 24 describes the Laplacian smoothing algorithm, with a scaling factor $0 < \lambda < 1$ which is used to control the speed of the diffusion process. With this parameter, one step of the linear isotropic Laplacian smoothing algorithm can be described in matrix form as follows $$x^1 = x + \lambda \Delta x = (I - \lambda K)x = f(K)x, \qquad (7)$$

where $f(K)$ is a matrix obtained by evaluating the univariate polynomial $f(k) = 1 - \lambda k$ in the matrix K. If the process is iterated N times, the output can still be expressed as $x^N = f(K)x$, but with a different univariate polynomial $f(k) = (1 - \lambda k)^N$. When $0 < \lambda < 1$, we see that for every $k \in (0, 2]$, we have $(1 - \lambda k)^N \to 0$ when $N \to \infty$ because $|1 - \lambda k| < 1$. This means that all the frequency components, other than the zero frequency component (the barycenter of all the vertices), are attenuated for large N. On the other hand, the neighborhood normalization constraint of equation 2 implies that the matrix K always has 0 as its first eigenvalue with associated eigenvector $(1, \ldots, 1)^t$, and the zero frequency component is preserved without changes because $f(0) = 1$ independently of the values of $\lambda$ and N. A similar analysis applies to the linear anisotropic case.

Taubin [18] proposed the following second degree transfer function to solve the problem of shrinkage $$f(k) = (1 - \lambda_0 k)(1 - \lambda_1 k), \qquad (8)$$

which can be implemented as two consecutive steps of Laplacian smoothing with different scaling factors; the first one with $\lambda_0 > 0$, and the second one with $\lambda_1 < -\lambda_0 < 0$.

To implement a more general linear filter, and by doing so being able to solve the shrinkage problem, we make the scaling factor $\lambda$ dependent on the iteration number i. That is, the scaling factor is now a vector $\lambda = (\lambda_0, \ldots, \lambda_{N-1})^t$, and the transfer function is $$f(k) = \prod_{i=0}^{N-1} (1 - \lambda_i k). \qquad (9)$$

A different way to implement FIR linear filters based on classical digital filter design techniques and Chebyshev polynomials was introduced by Taubin et.al. [21].

Ignoring numerical errors, in the linear case, the N Laplacian smoothing steps of equation 9 can be performed in any order, without affecting the result. Since the weights of the non-linear Laplacian operator are computed as a function of the signal values, in the non-linear case we have to be more precise. The same equation 9 can be used, but the non-linear Laplacian smoothing steps have to be performed in the specified order, as shown in the algorithm of FIG. 25.

6 Preventing Boundary Shrinkage

Although the normal vector to a polygon mesh is not defined at a vertex, it is customary to define it by averaging some local information for shading purposes. When the signal x in equation (1) corresponds to the 3-dimensional mesh vertex positions, the Laplacian operator can be used to define a normal vector $$n_i = \begin{cases} \dfrac{\Delta x_i}{\|\Delta x_i\|} & \text{if } \Delta x \neq 0 \\ 0 & \text{if } \Delta x_i = 0 \end{cases} \qquad (10)$$

When the length of edges incident to vertex i and the angles formed by these edges are all similar, the mesh is a discretization of a smooth surface, and the vertex is not on the boundary of the surface, this vector average approximates the curvature normal, modulo a scale factor function of the average edge length (sampling wavelength). In fact, the following expression can be used as the definition of the mean curvature $K_i$ [17] of the graph signal $$\frac{1}{2} \kappa_i n_i e_i^2 = \sum_{j \in i^*} w_{ij}(x_j - x_i), \qquad (11)$$

independently of the subjacent smooth surface, where $e_i^2$ is the average square length from vertex i to its neighbors $$e_i^2 = \sum_{j \in i^*} w_{ij} \|x_j - x_i\|^2.$$

Figure 26:
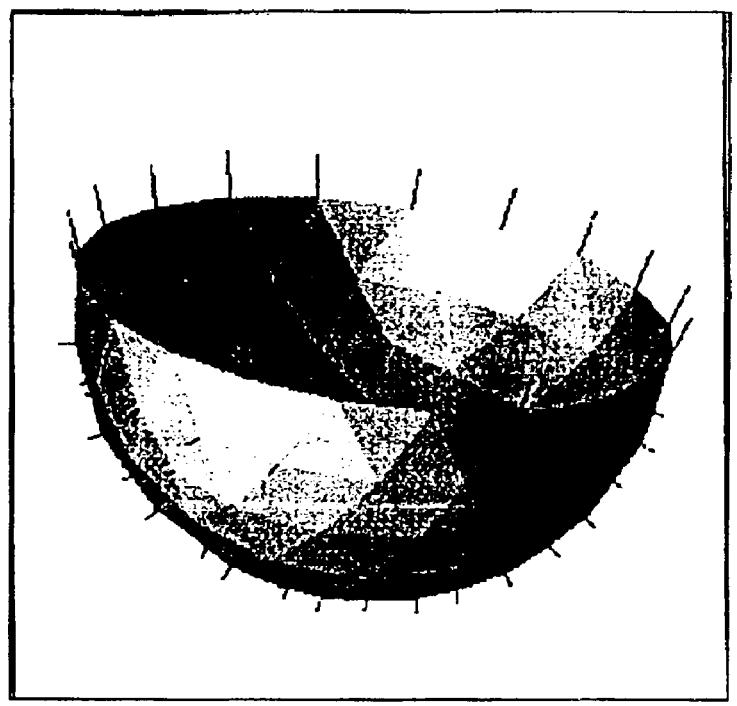
FIG. 26 shows the boundary shrinkage problem. Laplacian operator defines vertex displacements that approximate curvature normal at non-boundary vertices. The displacements have strong tangential components at boundary vertices. The negative of the Laplacian operator displacements are plotted because they easier to visualize.

When the vertex i is on the boundary of the mesh, the vector $\Delta x_i$ has a very strong tangential component, and the vector of equation 10 cannot be considered a good approximation of the surface normal. This problem is illustrated in FIG. 26. As a result, when an isotropic filter is applied to a mesh with boundary, while non-boundary vertices tend to move along the normal direction, boundary vertices tend to move in a tangential direction, producing shrinkage, even when the filter is a low-pass filter such as the $\lambda/\mu$ algorithm.

The hierarchical smoothing approach described by Taubin [18], where the boundary vertices are filtered as a curve independently of the rest of the mesh, is one way to prevent boundary shrinkage. But because the boundary and mesh smoothing processes proceed at different speeds, the boundary curves may be over-smoothed, and there is no control on the surface normals along the boundary.

The following alternative solution to the boundary shrinkage problem produces better results, and is a good motivation to the definition of the anisotropic Laplacian operator given above. In this case we need an additional vertex normal vector $n_i$ for each boundary vertex i, and we redefine the Laplacian operator for the boundary vertex i as the projection of the old Laplacian operator onto line defined by the normal vector $n_i$ $$\Delta x_i = n_i n_i^t \sum_{j \in i^*} w_{ij}(x_j - x_i).$$

The boundary vertex normal vectors can either be explicitly provided as constraints, or computed by averaging face normal vectors to incident faces.

Equivalently, we can define the following anisotropic weights $$W_{ij} = \begin{cases} w_{ij} n_i n_i^t & \text{if } i \text{ is a boundary vertex} \\ w_{ij} I & \text{if } i \text{ is not a boundary vertex} \end{cases}$$

where $w_{ij}$ is the old isotropic weight. The resulting linear anisotropic diffusion algorithm removes noise but the boundaries do not shrink.

7 Preventing Tangential Drift

The boundary shrinkage problem mentioned above is a particular case of the tangential drift problem. With unit edge costs, very satisfactory results are obtained with linear isotropic FIR filters [21] on meshes with no boundaries displaying very small variation in edge length and face angles across the whole mesh. When these assumptions are not met, local distortions are introduced, mainly because the Laplacian operator defines vertex displacement vectors with strong tangential components. The edge weights can be used to compensate for the irregularities of the tessellation, and produce results which are function of the local geometry of the signal, rather than the local parameterization. For example, shorter edges have to be given larger weights. The following non-linear strategies to compute weights have been proposed.

Fujiwara weights [6] try to compensate for irregular edge lengths by determining the edge costs as a function of the edge length $c_{ij}=\phi(\|v_j-v_i\|)$. For example, Fujiwara proposed the inverse of the edge length $\phi(t)=1/t$ as the function, which makes the Laplacian operator independent of the edge lengths, and only dependent on the directions of the vectors pointing to the neighboring vertices. This weighting scheme does not solve the problems arising from unequal face angles.

Desbrun weights [4] compensate not only for unequal edge lengths, but also for unequal face angles. Laplacian smoothing with equal edge costs tends to equalize the lengths of the edges, and so, tends to make the triangular faces equilateral. The vertex displacements produced by the Laplacian operator can be decomposed into a normal and a tangential component. In some cases the edge equalization is the desired effect, such as when mesh smoothing is used to improve the quality of finite-elements mesh. But in other cases, such as when a texture is mapped onto the mesh, having a non-zero tangential component is undesirable. Based on a better approximation to the curvature normal, Desbrun et.al. proposed the following choice of edge costs $$C_{ij} = \cot \alpha_{ij} + \cot \beta_{ij}, \tag{12}$$

where $\alpha_{ij}$ and $\beta_{ij}$ are the two angles opposite to the edge e=(i, j) in the two triangles having e in common. This choice of weights produces no tangential drift when all the faces incident to the vertex are coplanar.

The weighting schemes described above can be applied to a FIR filter, but both Fujiwara weights and Desbrun weights must be recomputed after each iteration, or at least after a small number of iterations. This makes the whole smoothing process a nonlinear operation, and computationally more expensive. The alternative solution that we propose in this paper is based on using a linear anisotropic Laplacian operator where the edge costs are computed as a function of the face normals, in such a way that tangential displacements are penalized. For example, if vertex j is a neighbor of vertex i, we can define $$C_{ij} = \sum_{f \in F_{ij}} c_{f_{ij}} n_f n_f^t, \tag{13}$$

where $F_{ij}$ is the set of faces incident to the edge joining vertices i and j, $n_f$ is the unit length normal vector to face $f$, and $C_{f_{ij}} \geq 0$ is a non-negative cost. In this paper we use $c_{f_{ij}}=1$ independently of $f$, i, or j, $C_i=c_i I$, and $C_i=\Sigma_{j \in i^*} \Sigma_{f \in F_{ij}} c_{f_{ij}}$, which produces excellent results. Note that for manifold meshes the set $F_{ij}$ is composed of only one or two elements. Another possible choice is to make $c_{f_{ij}}$ equal to the area of face $f$, but this would make the cost a non-linear function of the vertex coordinates, which we have been trying to avoid in this paper.

8 Laplacian Smoothing on the Sphere

In order for this linear anisotropic filter to produce the desired results, we need a smooth face normal field. Since the field of face normals of a noisy mesh is even noisier, we now have to solve the problem of smoothing a field of unit-length face normal vectors. We regard such vector field as a signal defined on the dual graph of the mesh, and with values in the unit sphere. We solve this problem again with Laplacian smoothing, or a more general FIR filter, based on a redefined Laplacian operator for signals with values in the unit sphere, and then use the algorithms described in FIG. 27.

The Laplacian operator can be applied to unit length vectors, but the result of one Laplacian smoothing step $$n_i' = n_i + \lambda \sum_{j \in i^*} w_{ij}(n_j - n_i)$$

is no longer a unit length vector. This can be fixed by normalizing the length of the resulting vector, but the results are poor, particularly when the angles between neighboring normals are large. A better solution is to look at the expression $\lambda w_{ij}(n_j-n_i)$ as a displacement along a geodesic on the sphere, i.e., along a great circle, and at the scaled Laplacian vector $\lambda \Delta n_i$ as the average of these displacements in a well-defined local chart.

The resulting displacement $\lambda \Delta n_i$ is represented by a rotation $R_i(\lambda)$, where the function $R_i(\lambda)$ is a continuous function of $\lambda$ such that when $\lambda=0$ the rotation is the identity $R_i(\lambda)=I$. For each neighbor j of i such that $n_i$ and $n_j$ are linearly independent, there are two rotations that keep the plane defined by the vectors $n_i$ and $n_j$ invariant. Of these two let $R_{ij}$ be the rotation of minimum angle. If $n_i=n_j$ we define $R_{ij}=I$, and we will assume that the case $n_i=-n_j$ never happens. In section 9 we show that the rotation $R_{ij}$ can be computed using Rodrigues' formula as $$R_{ij}=R(n_i\times n_j),$$

where $R(w)$ is the Rodrigues function that maps vectors of length not larger than one onto rotation matrices $$R:\{w:|w|\leq 1\}\to SO(3) \quad (14)$$

Now we can define the Laplacian operator for signals with values in the unit sphere as follows $$R_i(\lambda) = R\left(\lambda n_i \times \sum_{j\in i^*} w_{ij} n_j\right) \quad (15)$$

for $\lambda \leq 1$. We do all the scaling and averaging in the domain of $R(w)$ which is a convex subset of Euclidean space that contains the origin, and so close under scaling ($|\lambda|\leq 1$) and convex averaging ($\Sigma_j w_{ij}=1$).

Finally, we define a Laplacian smoothing step as follows $$n_i'=R_i(\lambda)n_i \quad (16)$$

Now we can implement any FIR filter using the polynomial factorization of equation 9. For example, one step of Taubin smoothing becomes $$n_i''=R_i(\lambda_1)R_i(\lambda_0)n_i$$

9 Rodrigues Formula

A 3D rotation can be represented as a 3×3 matrix $$R = \begin{pmatrix} R_{xx} & R_{xy} & R_{xz} \\ R_{yx} & R_{yy} & R_{yz} \\ R_{zx} & R_{zy} & R_{zz} \end{pmatrix}$$

orthogonal $RR^t=I$ and with unit determinant $|R|=1$. In particular, the inverse rotation is represented by the transposed matrix $R^{-1}=R^t$. The result of applying the rotation represented by the matrix R to a vector v is computed by multiplying the matrix by the vector Rv. The group of 3D rotation matrices, also called special orthogonal group of dimension 3, is usually denoted SO(3).

A more intuitive way of representing a 3D rotation is by specifying an axis of rotation with a unit length vector r, and an angle of rotation $\alpha$ in radians. Usually, these two values are jointly specified as a single vector $w=\alpha r$. The angle of rotation is the length of w, and the axis of rotation is determined by normalization $r=w/|w|$. In the case $|w|=0$, which corresponds to the identity matrix, the unit vector is not uniquely determined.

Since this representation produces multiple representatives for each rotation, and the conversion to matrix form requires computation of trigonometric functions, it is better to represent the rotation as a vector with length equal to the positive sine of the angle of rotation. The conversion from vector to matrix representation is given by Rodrigues formula $$R(w)=cI+(1-c)rr^t+sr^{\wedge} \quad (17)$$

where $s=(\|w\|^2)^{1/2}=\sin(\alpha)$, $c=(1-\|w\|^2)^{1/2}=\cos(\alpha)$, $sr=w$, and $$r^{\wedge} = \begin{pmatrix} 0 & -r_z & r_y \\ r_z & 0 & -r_x \\ -r_y & r_x & 0 \end{pmatrix}.$$

This last matrix is skew-symmetric $(r^{\wedge})^t=-r^{\wedge}$, and represents the vector product: when we multiply the matrix $r^{\wedge}$ by a vector v we obtain the vector product $r\times v$ $$r^{\wedge}v = r\times v = \begin{pmatrix} r_y v_z - r_z v_y \\ r_z v_x - r_x v_z \\ r_x v_y - r_y v_x \end{pmatrix}.$$

Rodrigues' formula defines the function $R:\{w:|w|\leq 1\}\to SO(3)$ which is clearly 1-1 and continuous for $w\neq 0$, but it is not difficult to show that it is well defined and continuous at $w=0$ as well.

To convert from matrix to vector representation we first note that, since $cI+(I-c)rr^t$ is symmetric, and $sr^{\wedge}$ skew-symmetric, the transpose of the matrix R in equation 17 is $$R^t=cI+(1-c)rr^t-sr^{\wedge}$$

and so, the skew-symmetric part of R is $$(R-R^t)/2=sr^{\wedge}=(sr)^{\wedge}. \quad (18)$$

The value of s is obtained as the length of the vector $w=sr$. The value of c is obtained by computing a square root $c=\sqrt{1-s^2}$. With c and s we can determine $\alpha$, if needed. And the unit length vector r is obtained by normalization, except when $R-R^t=0$, which corresponds to the identity rotation $R=I$. This case has multiple solutions. So, the inverse of Rodrigues' formula of equation 18 defines the inverse function $$\omega = \begin{pmatrix} \omega_x \\ \omega_y \\ \omega_z \end{pmatrix} = \frac{1}{2}\begin{pmatrix} R_{zx} - R_{xz} \\ R_{xz} - R_{zx} \\ R_{yx} - R_{xy} \end{pmatrix}.$$

If $n_i$ and $n_j$ are two unit length vectors such that $n_i+n_j\neq 0$, it is not difficult to show that $$R(n_i\times n_j)n_i=n_j.$$

10 Integration of Face Normal Fields

In this section we first study the existence and uniqueness of solution to the problem of reconstructing the mesh vertex positions from a given field of face normals. Then we formulate an orthogonal decomposition theorem that explains the least squares solution of the previous problem in the case where an exact solution does not exists. Finally, we discuss how our algorithm relates to the solution of these problems. Our approach is totally self-contained and based on basic concepts from linear algebra.

10.1 Integrability

We restrict our analysis here to the case of triangle meshes, where the notation is simpler. The results can be extend to general polygon meshes, but we leave the details of the extension to the reader, or a subsequent paper.

The problem is this: given a non-zero vector $u_f$ for each face $f=(i, j, k)$ of a triangular mesh M, we want to describe the set S of vertex positions $(x_1, \ldots, x_n)$ so that, for each triangular face $f$, the vector $u_f$ is orthogonal to the plane defined by the points $\{x_i, x_j, x_k\}$, and in what sense our algorithm helps find the elements of S. In principle, the set S may be empty (i.e., the field is not integrable), may be composed of a single element (i.e., the problem has a unique solution), may be composed of a finite number of element (i.e., the problem has a multiple solutions), or may be composed of an infinite number of elements (i.e., the problem has free degrees of freedom).

Unconstrained case We first consider the case where no further constraints are imposed on the vertex positions. The face orthogonality conditions described above are equivalent to the following family of simultaneous linear equations $$\forall f = (i, j, k) : \begin{cases} u_f^t(x_j - x_i) = 0 \\ u_f^t(x_k - x_j) = 0 \\ u_f^t(x_i - x_k) = 0 \end{cases} \quad (19)$$

Note that for each face $f$, the corresponding three equations are linearly dependent because their sum is equal to zero. As a result, we can discard one of the three equations, and obtain an homogeneous system of 2F equations in 3V variables, which we rewrite in matrix form as follows $$\begin{pmatrix} \vdots & \vdots & \\ \cdots & -u_f & u_f & \cdots \\ \vdots & \vdots & \\ \cdots & u_f & 0 & \cdots \\ \vdots & \vdots & \\ \cdots & 0 & -u_f & \cdots \\ \vdots & \vdots & \end{pmatrix}^t \begin{pmatrix} \vdots \\ x_i \\ \vdots \\ x_j \\ \vdots \\ x_k \\ \vdots \end{pmatrix} = 0. \quad (20)$$

If U denotes the $3V \times 2F$ left matrix, and X the 3V-dimensional right vector, we have $U^t X=0$. Since the equations are linear an homogeneous, the space of solutions is a subspace in $\mathbb{R}^{3V}$. Note that the dimension of this subspace is at least 3, because the constant vector $x_i=x$ for $i=1, \ldots, V$ is a solution of our problem for any point $x \in \mathbb{R}^3$. Since the problem is invariant with respect to translations, we can reduce its dimensionality by imposing the constraint $x_{V-1}=0$. A solution of the original system can be decomposed as a solution of the reduced system plus a 3D translation. Let $\tilde{U}$ be the $(3V-3) \times 2F$ matrix obtained from U by deleting the last row, and let $\tilde{X}$ be the $(3V-3)$-dimensional right vector obtained from X by deleting the last three coordinates corresponding to $x_{V-1}$. Now, our original problem has a solution if and only if the system $\tilde{U}^t \tilde{X}=0$ has a non-trivial solution, and the solution is unique if and only if the dimension of the subspace of solutions is 1. Equivalently, if $0 \leq \lambda_1 \leq \lambda_2 \leq \ldots$ are the singular values of $\tilde{U}$, the problem has a solution if $\lambda_1=0$ as well, and the solution is unique if $\lambda_i > 0$. If $\lambda_1 = \ldots = \lambda_h=0$ and $\lambda_{h+1}>0$, the problem has multiple solutions, and the subspace of solutions has dimension h. That is, the problem has h degrees of freedom in addition to the 3 degrees of freedom corresponding to the invariance to translation. A unique solution can be obtained by imposing further independent linear constraints. Also note that since the problem is homogeneous, the solutions can only be obtained modulo scale.

In the overconstrained case $3V-3 \leq 2F$, the problem may have no solution, a unique solution (modulo scale), or multiple degrees of freedom. In the last case, the general solution can be represented as a linear combination of the singular vectors corresponding to the zero singular values. In the underconstrained case $3V-3 > 2F$, when we have fewer equations than unknowns, the dimension of the subspace of solutions is at least $3V-3-2F>0$, and the problem always has at least one solution.

If the triangular mesh is manifold without boundary, the numbers of vertices V, edges E, and faces F satisfy the Euler formula $V-E+F=2(1-G)$ where $G \geq 0$ is the genus of the mesh. For example, a sphere has genus 0 and a torus has genus 1. Since each triangular face of a manifold mesh without boundary corresponds to three half-edges, or $3F=2E$, we obtain a necessary and sufficient condition for the problem to be overconstrained $$V-3 \leq 2F \iff 2-4G > F.$$

For example, for a mesh with sphere topology we get $F \geq 2$, which is always satisfied because the tetrahedron is the smallest in this class with F=4. For higher genus, the left term is negative, and the condition is always satisfied. If the triangular mesh is manifold with boundary, a similar necessary and sufficient condition can be derived involving in addition the number of boundary loops L and the number of boundary edges B, but it is a lot easier just to check the original inequality. In this case the system can be underconstrained. For example, look at the extreme case of F disconnected triangles with V=3F vertices.

Constrained case In the case of triangular meshes with boundary, where a large number of boundary edges may result in an underconstrained system of equations, further constraints can be imposed by specifying, for example, the positions of some or all of the boundary vertices. In general, we will consider the case when C of the vertices are constrained to be in specified locations. Since the ordering of the vertices is irrelevant, we will assume without loss of generality that the vertices $x_1, \ldots, x_C$ are constrained, and the vertices $x_{C+1}, \ldots, x_V$ are free. Since the invariance to translation no longer applies here, we need to look at the original system of equations $U^t X=0$. We partition the matrix U into two matrices $U_1$ and $U_2$. The first one composed of the first 3C rows of V, and the second one composed of the remaining rows. We also partition the vector X into $X_1$ and $X_2$ in a similar manner. The system to be solved can be written as follows $$U_1^t X_1 + U_2^t X_2 = 0,$$

where $U_1$, $U_2$, and $X_1$ are given. For the system not to be underconstrained, we need to have at least as many equations as variables, i.e., $3(V-C) \leq 2F$. In this case the problem has a unique solution if and only if the rank of the matrix $U_2$ is equal to $3(V-C)$, and the solution is $$\hat{X}_2 = -U_2^{t\dagger} V_1^t X_1$$

with $U_2^{t\dagger} = (U_2 U_2^t)^{-1} U_2$ the pseudo-inverse of $U_2^t$. If the rank of the matrix $U_2$ is less than $3(V-C)$ the problem still has free degrees of freedom, and if the rank is larger than $3(V-C)$ the problem has no solution. In this case the least squares solution is also described by the previous equation.

10.2 Orthogonal Decomposition

Helmholtz decomposition theorem, used extensively in electromagnetism, states that every smooth vector field in $\mathrm{IR}^3$ can be decomposed as the sum of two components: a rotation-free vector field (gradient of a scalar potential) and a divergence-free vector field (curl of a potential vector field)

$$F = \nabla \phi + \nabla \times B.$$

For vector fields defined on surfaces, Hodge decomposition theorem states that every vector field on a surface can be decomposed into three components: a rotation-free vector field, a divergence-free vector field, and a harmonic vector field (with zero Laplacian). We seek a similar decomposition of vector fields defined on the faces of a mesh, where the concept of integrable face vector field on a mesh correspond to rotation-free smooth vector field on a surface.

In general, in the unconstrained case, given an arbitrary non-zero vector $u_f$ for each face $f=(i, j, k)$ of the triangular mesh M, the system of equations 19 will have no solution. Equivalently, the first singular value $\lambda_1$ of the matrix $\tilde{U}$ is positive.

If vertex positions $(x_1, \ldots, x_n)$ are given and no triangular face is degenerate (zero surface area), the face vector field $u_{7f}$ can be decomposed as the sum of a normal face field and a tangent vector field. In general, even if some faces defined by the vertex positions are degenerate, we can define the following face vector field $$n_f = \begin{cases} \frac{(x_j - x_i) \times (x_k - x_j)}{\|(x_j - x_i) \times (x_k - x_j)\|} & \text{if } (x_j - x_i) \times (x_k - x_j) \neq 0 \\ 0 & \text{if } (x_j - x_i) \times (x_k - x_j) = 0 \end{cases} \quad (21)$$

For a non-degenerate face $n_f$ is a unit length normal vector to face $f$ defined by the points $\{x_i, x_j, x_k\}$. Otherwise it is the zero vector. Now we can define the normal component of $U_f$ as $u_{Nf} = n_f n_f^t u_f$ and the tangential component by $u_{Tf} = (I - n_f n_f^t) u_f$. If $U_N$ and $U_F$ are the 3V×2F matrices constructed as $\tilde{U}$ in equation 20 from the face vector fields $u_{Nf}$ and $u_{Tf}$, we have $U = U_N + U_T$ and $U_N^t U_T = 0$. In addition, by construction $U_N^t X = 0$ and the first singular value of $U_N$ is zero $\lambda_{N1} = 0$ corresponding to the singular vector $\tilde{X}$. The problem we are facing here is to find vertex positions X minimizing the tangential error $\|U_T^t X\|^2 / \|X\|^2$ defined by the decomposition described above.

Note that, since by construction $U_N^t X = 0$ and $U_N^t U_T = 0$, we have $\|U^t X\|^2 = \|U_T^t X\|^2$, and the solution to this problem is given by the least squares solution to the original problem. Solving the system of equation 19 in the least squares sense is equivalent to the minimization of the following quadratic function $$\psi_u(x) = \|U^t X\|^2 = \sum_f \sum_{(i,j) \in \partial f} (u_f^t (x_i - x_j))^2. \quad (22)$$

Since the equations are homogeneous, the first non-trivial solution corresponds to the singular vector associated with the first singular value $\lambda_1$ of $\tilde{U}$ ($\lambda_4$ of U). Equivalently, $$\min_X \frac{\|U^t X\|^2}{\|X\|^2} = \lambda_1^2.$$

Note that in general, the solution to this problem obtained in this way may define a mesh with degenerate triangular faces. We leave the problem of determining conditions for non-degenerate solutions for future study.

A similar line of reasoning can be followed in the constrained case, which includes additional linear constraints (fixed boundary vertex positions).

10.3 Integration Algorithms

The linear anisotropic Laplacian smoothing algorithm introduced in this paper to integrate a field of face normals is a descent algorithm for the quadratic function 22. The anisotropic Laplacian operator introduced in previous sections is the negative of the gradient of $\psi_u(X)$, scaled to make it converge in a stable fashion. Since the function being minimized is convex, our algorithm converges to the global minimum.

11 Implementation and Applications

Figure 28:
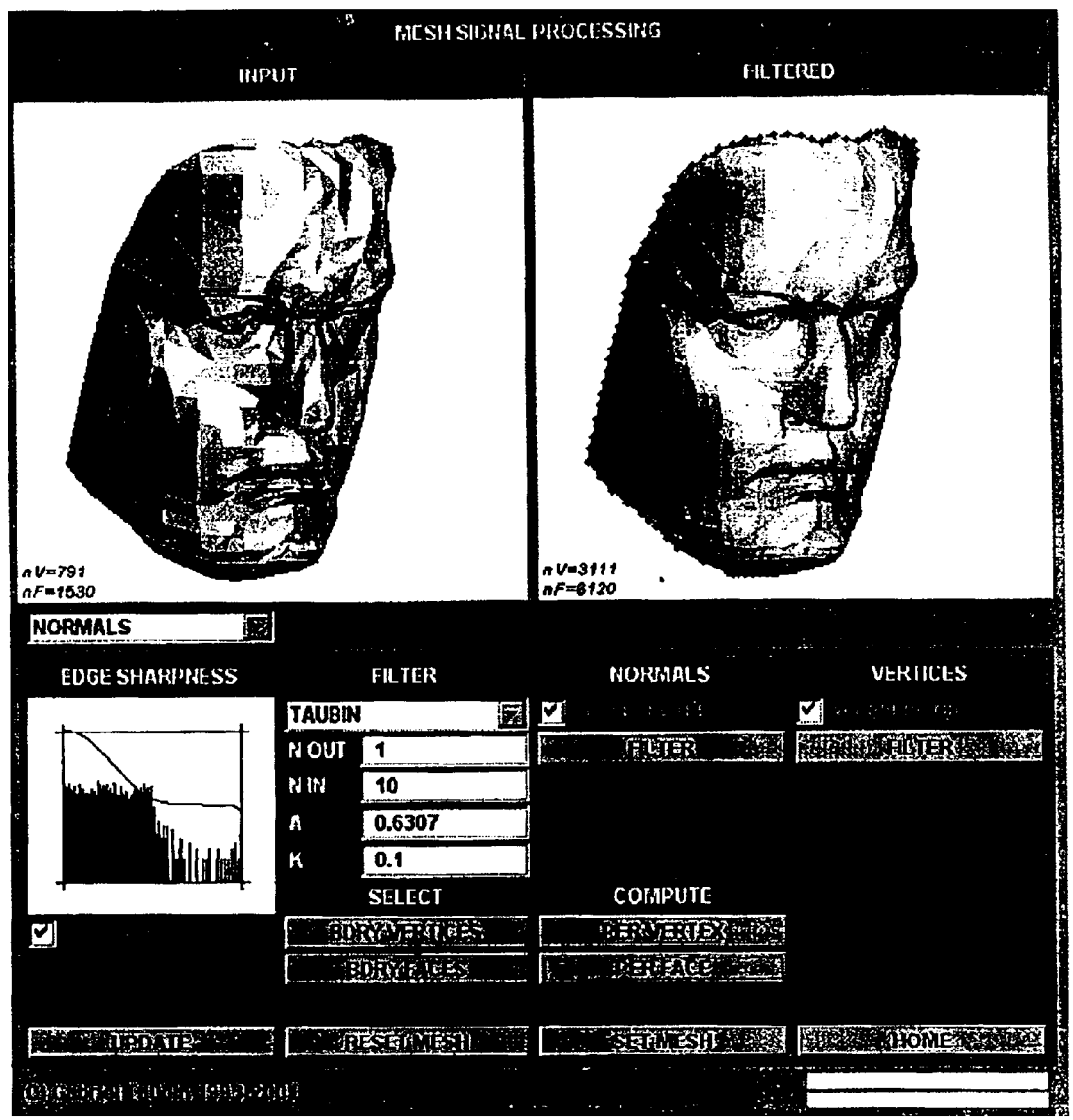
FIG. 28 shows Java implementation of the algorithms introduced in this paper.
Figure 29A:
FIG. 29 shows hierarchical smoothing can be used to introduce crease edges. (B) The result of applying 10 steps of Taubin smoothing without constraints. Observe the shrinkage of the boundary and the over-smoothing of the crease lines. (C) The result of applying 10 of Taubin smoothing with hierarchical constraints, but ignoring the crease lines. The boundary curve is smoothed independently of the interior vertices. (D) Same as (C) but taking the crease edges into account. (E) The result of applying 10 steps of Taubin smoothing with fixed vertices on the tagged edges. Noise present on the boundary vertices remains. (F) The result of applying the new algorithm introduced in this paper with fixed face normals and vertices incident to tagged and boundary edges.
Figure 29B:
Figure 29C:
Figure 29D:
Figure 29E:
Figure 29F:
Figure 30A:
FIG. 30 shows pre-smoothing of boundary curves. (A) Noisy mesh with noisy boundary curve. (B) The result of applying the algorithm introduced in this paper with fixed boundary vertices and faces. (C) Same as (B) but with 2 steps of Laplacian smoothing along the boundary as a pre-processing phase. (D) (C) Same as (B) but with 2 steps of Taubin smoothing along the boundary as a pre-processing phase.
Figure 30B:
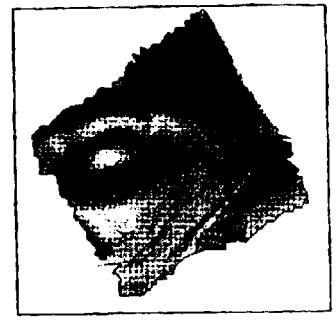
Figure 30C:
Figure 30D:
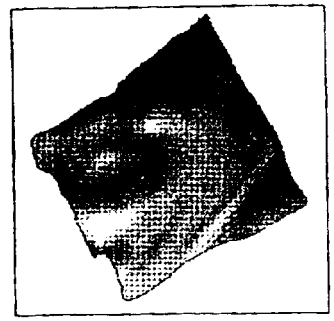
Figure 31A:
FIG. 31 shows an application to mesh design in conjunction with recursive connectivity subdivision operators. (A) Coarse triangular mesh. (B) After two steps of linear triangle quadrisection with vertices inserted at the midpoints of edges. (C) After applying the algorithm introduced in this paper with 10 steps of Taubin smoothing on the face normal field, followed by 10 steps of linear anisotropic Laplacian smoothing on the vertex positions. (D) Same as (C) but using 10 steps of isotropic Laplacian smoothing to smooth the field of face normals.
Figure 31B:
Figure 31C:
Figure 31D:

The intended application of these algorithms is as tools in an interactive shape design system. FIG. 28 shows a screen dump of our prototype implementation written in Java, which integrates a number of related mesh processing algorithms. All the illustrations presented in this paper have been generated with this tool.

Figure 21A:
FIG. 21 shows an application to smoothing without tangential drift. (A) Noisy mesh with irregular edge length distribution. (B) After 4 steps of unit-length isotropic Laplacian smoothing of face normals with A=0.5, constrained boundary faces (blue), and fix vertices. (C) After 10 subsequent steps of face normal integrating anisotropic Laplacian smoothing on vertex positions with A=0.5, constrained boundary vertices (red), and fix face normals. Flat-shading used to enhance the faceting effect. Connectivity is kept constant.
Figure 21B:
Figure 21C:

Overall, in the applications to noise removal a small number of iterations produce satisfactory results, even for very large meshes such as the one shown in FIG. 21. We envision applications to shape design, where the user interactively modify the face normal field, and then linear anisotropic Laplacian smoothing is used to integrate the field of face normals. In this case the initial position of the vertices may be very far away from their intended destination, and a large number of iterations may be needed to produce satisfactory results. This is so because the length of the displacement vector defined by the Laplacian operators at a vertex is never longer than the average length of edges incident to that vertex. In this case a multi-resolution approach is advisable [11, 12].

11.1 Extensions

We describe in this section a number of potential extensions and applications. Some are implemented and some are not. Those implemented are in different states of maturity.

Hierarchical smoothing The hierarchical smoothing approach described by Taubin [18] can be applied in conjunction with the algorithm introduced in this paper to achieve more precise control along boundaries and tagged discontinuity edges, and non-manifold meshes. In addition to the faces incident to the boundary edges, faces incident to other tagged edges can be constrained during the face normals smoothing process to produce interesting effects such as introduction and shape control of creases. FIG. 29 shows an example of this application, comparing different variations of older algorithms and constraints with the new algorithm introduced in this paper.

Boundary smoothing If we constrain boundary vertices and faces not to move at all during the smoothing process, we may obtain undesirable results along noisy boundaries. FIG. 30 shows additional ways to smooth boundary curves as a pre-processing step to produce more pleasing shapes.

Vertex normal fields Sometimes mesh normals are specified at the vertices, rather than the faces of the mesh. If the mesh is manifold, we can apply the algorithm introduced in this paper to reconstruct the position of the vertices of the dual mesh, and then reconstruct the positions of the primal vertices by dual mesh resampling [20], which is yet another variation of Laplacian smoothing.

Subdivision meshes The algorithm introduced in this paper can be used to design piecewise smooth meshes as a sequence of connectivity refinement and smoothing steps performed within and interactive modelling system [18]. FIG. 31 shows some examples of this use in connection with triangle quadrisection as the connectivity refinement operator.

References

[1] H. Bierman, A. Levin, and D. Zorin. Piecewise smooth subdivision surfaces with normal control. In *Siggraph'2000 Conference Proceedings*, 2000.

[2] U. Clarenz, U. Diewald, and M. Rumpf. Anisotropic geometric diffusion in surface processing,. In *Proceedings of IEEE Visualization* 2000, October 2000.

[3] M. Desbrun, M. Meyer, P. Schroder, and A. Barr. Anisotropic feature-preserving denoising of height fields and bivariate data. In *Proceedings of Graphics Interface 2000*, May 2000.

[4] M. Desbrun, M. Meyer, P. Schröder, and A. H. Barr. Implicit fairing of irregular meshes using diffusion and curvature flow. In *Siggraph'99 Conference Proceedings*, pages 317–324, August 1999.

[5] D. A. Field. Laplacian smoothing and delaunay triangulations. *Communications in Applied Numerical Methods*, 4:709–712, 1984.

[6] K. Fujiwara. Eigenvalues of laplacians on a closed riemannian manifold and its nets. *Proceedings of the AMS*, 123:2585–2594, 1995.

[7] G. Golub and C. F. Van Loan. *Matrix Computations*. John Hopkins University Press, 2nd. edition, 1989.

[8] K. Ho-Le. Finite element mesh generation methods: A review and classification. *Computer Aided Design*, 20(1):27–38, 1988.

[9] G. Husler and S. Karbacher. Reconstruction of smoothed polyhedral surfaces from multiple range images. In *Proceedings of 3D Image Analysis and Synthesis '97*, pages 191–198, Sankt Augustin, 1997. Infix Verlag.

[10] S. Karbacher and G. Husler. A new aproach for modeling and smoothing of scattered 3d data. In R. N. Ellson and H. Nurre, editors, *Proceedings of the SPIE on Three-Dimensional Image Capture and Applications*, volume 3313, pages 168–177, 1998.

[11] L. Kobbelt, S. Campagna, J. Vorsatz, and H. -P. Seidel. Interactive multi-resolution modeling on arbitrary meshes. In *Siggraph'98 Conference Proceedings*, pages 105–114, July 1998.

[12] L. Kobbelt, J. Vorsatz, and H. -P. Seidel. Multiresolution hierarchies on unstructured triangle meshes. *Computational Geometry Theory and Applications*, 1999. special issue on multi-resolution modeling and 3D geometry compression.

[13] S. Kuriyama and K. Tachibana. Polyhedral surface modeling with a diffusion system. In *Eurographics'97 Conference Proceedings*, pages C39-C46, 1997.

[14] Y. Ohtake, A. Belyaev, and I. Bogaevski. Mesh regularization and adaptive smoothing. *Computer-Aided Design*, 33:789–800, 2001.

[15] Y. Ohtake, A. G. Belyaev, and I. A. Bogaevski. Polyhedral surface smoothing with simultaneous mesh regularization. In *Geometric Modeling and Processing 2000 Conference Proceedings*, pages 229–237, Hong Kong, April 2000.

[16] P. Perona and J. Malik. Scale-space and edge detection using anisotropic diffusion. *IEEE Transactions on Pattern Analysis and Machine Intelligence*, July 1990.

[17] G. Taubin. Estimating the tensor of curvature of a surface from a polyhedral approximation. In *Proceedings, International Conference on Computer Vision (ICCV)*, 1995.

[18] G. Taubin. A signal processing approach to fair surface design. In *Siggraph'95 Conference Proceedings*, pages 351–358, August 1995.

[19] G. Taubin. Geometric signal processing on polygonal meshes. In *Eurographics 2000 State of The Art Report (STAR)*, September 2000.

[20] G. Taubin. Dual mesh resampling. In *Conference Proceedings, Pacific Graphics* 2001, Tokyo, Japan, October 2001.

[21] G. Taubin, T. Zhang, and G. Golub. Optimal surface smoothing as filter design. In *Fourth European Conference on Computer Vision (ECCV'96)*, 1996. Also as IBM Technical Report RC-20404, March 1996.

[22] J Weickert. *Scale-Space Theory in Computer Vision*, volume 1252 of *Lecture Notes in Computer Science*, chapter A Review of Nonlinear Diffusion Filtering, pages 3–28. Springer-Verlag, 1997.

[23] A. Yamada, T. Furuhata, K. Shimada, and K. Hou. A discrete spring model for generating fair curves and surfaces. In *Proceedings of the Seventh Pacific Conference on Computer Graphics and Applications*, pages 270–279, 1998.

[24] D. Zorin, P. Schröder, and W. Sweldens. Interactive multiresolution mesh editing. In *Siggraph'97 Conference Proceedings*, pages 259–268, August 1997.

I claim:

1. A method comprising:

obtaining a first spherical graph signal defined on a graph, the graph including a plurality of graph vertices and a plurality of graph edges, the first spherical graph signal including a plurality of spherical signal points, each spherical signal point being a point in a N-dimensional sphere of a given radius, each spherical signal point corresponding to one of the graph vertices;

applying a spherical graph signal smoothing algorithm to the first spherical graph signal to produce a smoothed spherical graph signal defined on the graph, the smoothed spherical graph signal including a plurality of smoothed spherical signal points, each smoothed spherical signal point being a point in the N-dimensional sphere, each of the smoothed spherical signal points corresponding to one of the graph vertices; and replacing the first spherical graph signal with the smoothed spherical graph signal.

2. A method as recited in claim 1, wherein the step of obtaining includes at least one of the following steps:

computing the first spherical graph signal as face normals of a polygon mesh;

reading the first spherical graph signal from an output of a computer program;

reading the first spherical graph signal from a computer memory buffer;

reading the first spherical graph signal from a display screen buffer;

reading the first spherical graph signal a computer file snored in a non-volatile storage medium;

reading the first spherical graph signal a computer file stored in a magnetic storage device;

reading the first spherical graph signal a computer file stored in an optical storage device;

reading the first spherical graph signal a computer file stored in a computer network;

scanning the first spherical graph signal a document;

multidimensional scanning the first spherical graph signal from a physical object;

drawing the first spherical graph signal with an electronic tablet;

constructing the first spherical graph signal with an interactive modeling system;

constructing the first spherical graph signal with a computer-aided design system;

constructing the first spherical graph signal with a computer animation system;

reconstructing the first spherical graph signal from multiple photographs; and reconstructing the first spherical graph signal using a three-dimensional photography system.

3. A method as recited in claim 1, wherein the step of applying the spherical graph signal smoothing algorithm comprises the steps of:

constructing a vertex rotation matrix for each of the graph vertices of the graph; and multiplying the vertex rotation matrix by the spherical signal point corresponding to the graph vertex to produce the smoothed spherical signal point corresponding to the same graph vertex.

4. A method as recited in claim 3, wherein the step of constructing the vertex rotation matrix comprises the steps of:

determining a vertex neighborhood of the graph vertex of the graph, the vertex neighborhood being a set of neighbor graph vertices, each neighbor graph vertex being a particular graph vertex of the graph different from the graph vertex, each neighbor graph vertex being connected to the graph vertex by a particular graph edge of the graph;

computing a neighbor rotation matrix for each neighbor graph vertex of the vertex neighborhood;

obtaining a neighbor weight for each neighbor graph vertex of the vertex neighborhood; and evaluating the vertex rotation matrix as a weighted average of the neighbor rotation matrices using the neighbor weights.

5. A method as recited in claim 4, wherein the neighbor rotation matrix is a plane rotation, the plane rotation having a plane rotation subspace and an invariant subspace, the plane rotation subspace and the invariant subspace being orthogonal subspaces, the plane rotation subspace and the invariant subspace spanning N-dimensional space.

6. A method as recited in claim 5, wherein the plane rotation subspace includes the spherical signal point corresponding to the graph vertex and the spherical signal point corresponding to the neighbor graph vertex.

7. A method as recited in claim 4, wherein the rotation matrix satisfies a property such that a result of multiplying the neighbor rotation matrix by the spherical signal point corresponding to the graph vertex is equal to the spherical signal point corresponding to the neighbor graph vertex.

8. A method as recited in claim 4, wherein the step of evaluating the vertex rotation matrix comprises the steps of:

choosing a local parameterization of the group of rotations, the local parameterization having an inverse local parameterization;

computing a neighbor parameter value for each of the neighbor rotation matrices, the neighbor parameter value being equal to the inverse local parameterization evaluated at the neighbor rotation matrix;

computing a weighted average parameter value as a sum of a plurality of weighted neighbor parameter values, each weighted neighbor parameter value corresponding to one of the neighbor vertices, each weighted neighbor parameter value being equal to a product of the neighbor weight times the neighbor parameter value corresponding to said neighbor vertex; and evaluating the local parameterization at the weighted average parameter value to produce the vertex rotation matrix.

9. A method as recited in claim 8, wherein the local parameterization of the group of rotations is a local parameterization taken from a group of local parameterizations including:

an exponential map parameterization;

a quaternions parameterization; or a Cayley rational parameterization.

10. A method as recited in claim 4, wherein the neighbor rotation matrix is computed using Rodrigues' formula.

11. A method as recited in claim 1, further comprising repeating the steps of applying and replacing until a spherical smoothing criterion is met.

12. A method as recited in claim 11, wherein the spherical smoothing criterion includes at least one stopping criterion taken from a group of stopping criteria including:

maximal error tolerance; and maximal number of iterations.

13. A method as recited in claim 1, wherein the graph is a dual graph of a polygon mesh.

14. A method as recited in claim 1, wherein the spherical graph signal is a face normal signal of a polygon mesh.

15. A method as recited in claim 1, wherein the step of replacing comprises the following steps:

determining a set of unconstrained graph vertices, each unconstrained graph vertex being a particular graph vertex of said graph; and replacing each spherical signal point of the first spherical signal corresponding to each unconstrained graph vertex of the set of unconstrained graph vertices with the smoothed spherical signal point corresponding to said unconstrained graph vertex.

16. A method as recited in claim 15, wherein the set of unconstrained graph vertices contains all the graph vertices of said graph.

17. A method comprising:

obtaining a graph signal defined on a graph, the graph including a plurality of graph vertices and a plurality of graph edges, the graph signal including a plurality of signal points, each signal point being a point in a N-dimensional space, each signal point corresponding to one of the graph vertices;

applying an anisotropic graph signal filter algorithm to the graph signal to produce a filtered graph signal defined on the graph, the filtered graph signal including a plurality of filtered signal points, each filtered signal point being a point in the same N-dimensional space each of the filtered signal points corresponding to one of the graph vertices; and replacing the graph signal with the filtered graph signal.

18. A method as recited in claim 17, wherein the step of obtaining includes at least one of the following steps:

computing the graph signal an face normals of a polygon mesh;

reading the graph signal from the output of a computer program;

reading the graph signal from a computer memory buffer;

reading the graph signal from a display screen buffer;

reading the graph signal a computer file stored in a non-volatile storage medium;

reading the graph signal a computer file stored in a magnetic storage device;

reading the graph signal a computer file stored in an optical storage device;

reading the graph signal a computer file stored in a computer network;

scanning the graph signal a document;

multidimensional scanning the graph signal from a physical object;

drawing the graph signal with an electronic tablet;

constructing the graph signal with an interactive modeling system;

constructing the graph signal with a computer-aided design system;

constructing the graph signal with a computer animation system;

reconstructing the graph signal from multiple photographs; and reconstructing the graph signal using a three-dimensional photography system.

19. A method as recited in claim 17, wherein the step of applying the anisotropic graph signal filter algorithm comprises the steps of:

constructing a vertex displacement for each of the graph vertices of the graph, the vertex displacement being a vector in the N-dimensional space;

adding the vertex displacement to the corresponding signal point to produce the filtered signal point corresponding to the same graph vertex.

20. A method as recited in claim 17, wherein the step of constructing the vertex displacement comprises the steps of:

determining a vertex neighborhood of the graph vertex of the graph, the vertex neighborhood being a set of neighbor graph vertices, each neighbor graph vertex being a particular graph vertex of the graph different from the graph vertex, each neighbor graph vertex being connected to the graph vertex by a particular graph edge of the graph;

computing a neighbor displacement for each neighbor graph vertex of the vertex neighborhood, the neighbor displacement being a vector in the N-dimensional space, the neighbor displacement computed by subtracting the signal point corresponding to the graph vertex from the signal point corresponding to the neighbor graph vertex;

obtaining a neighbor weight matrix for each neighbor graph vertex of the vertex neighborhood, the neighbor weight matrix being a matrix with N rows and N columns; and evaluating each vertex displacement as the sum of a plurality of weighted neighbor displacement, each weighted neighbor displacement corresponding to one neighbor graph vertex, each weighted neighbor displacement being equal to the product of the neighbor weight matrix corresponding to the neighbor graph vertex times the neighbor displacement corresponding to the same neighbor graph vertex.

21. A method as recited in claim 17, further comprising repeating the steps of applying and replacing until an anisotropic smoothing criterion is met.

22. A method as recited in claim 21, wherein the anisotropic smoothing criterion includes at least one stopping criterion taken from a group of stopping criteria including:

maximal error tolerance; and maximal number of iterations.

23. A method as recited in claim 20, where the graph is a primal graph of a polygon mesh.

24. A method as recited in claim 23, where the graph signal is a vertex position signal of a polygon mesh.

25. A method as recited in claim 23, where the step of obtaining each neighbor weight matrix corresponding to each neighbor graph vertex of each vertex neighborhood of each graph vertex comprises the steps of:

identifying a set of polygon mesh faces incident to a neighbor edge, the neighbor edge being a graph edge, the graph edge having the graph vertex and the neighbor graph vertex as ends, the set of polygon mesh faces containing one or more edge polygon mesh faces, each edge polygon mesh face being a polygon mesh face incident to the neighbor edge; and obtaining the neighbor weight matrix as the average of a set of projection matrices, each projection matrix in the set of projection matrices being a matrix with N rows and N columns, each projection matrix in the set of projection matrices corresponding to one particular polygon mesh face in the set of polygon mesh faces, each projection matrix in the set of projection matrices representing the orthogonal projection onto a face plane, the face plane being a plane in N-dimensional space.

26. A method as recited in claim 17, wherein the step of replacing comprises the following steps:

determining a set of unconstrained graph vertices, each unconstrained graph vertex being a particular graph vertex of said graph; and replacing each signal point of the graph signal corresponding to each unconstrained graph vertex of the set of unconstrained graph vertices with the filtered signal point corresponding to said unconstrained graph vertex.

27. A method as recited in claim 26, wherein the set of unconstrained graph vertices contains all the graph vertices of said graph.

28. A method comprising:

obtaining a polygon mesh having a polygon mesh connectivity and a vertex position signal;

obtaining a face normal signal for the polygon mesh;

smoothing the face normal signal;

integrating the vertex position signal and the face normal signal to produce a filtered vertex position signal; and replacing the vertex position signal with the filtered vertex position signal.

29. A method, as recited in claim 28, where the step of obtaining the polygon mesh includes at least one of the following steps:

reading the polygon mesh from the output of a computer program;

reading the polygon mesh from a computer memory buffer;

reading the polygon mesh from a display screen buffer;

reading the polygon mesh a computer file stored in a non-volatile storage medium;

reading the polygon mesh a computer file stored in a magnetic storage device;

reading the polygon mesh a computer file stored in an optical storage device;

reading the polygon mesh a computer file stored in a computer network;

scanning the polygon mesh from a document;

multidimensional scanning the polygon mesh from a physical object;

drawing the polygon mesh with an electronic tablet;

constructing the polygon mesh with an interactive modeling system;

constructing the polygon mesh with a computer-aided design system;

constructing the polygon mesh with a computer animation system;

reconstructing the polygon mesh from multiple photographs; and reconstructing the polygon mesh using a three-dimensional photography system.

30. A method, as recited in claim 29, where the face normal signal is obtained from the same source as the polygon mesh.

31. A method, as recited in claim 28, where the step the face normal signal is obtained as a function of the vertex positions of the vertex position signal.

32. A method, as recited in claim 28, where:

said polygon mesh connectivity includes a plurality of polygon mesh vertices and a plurality of polygon mesh faces, each polygon mesh face being a cycle of three or more polygon mesh corners, each polygon mesh corner corresponding to one of the polygon mesh vertices, each polygon mesh edge being an unordered pair of polygon mesh vertices that are consecutive in at least one polygon mesh face;

said vertex position signal is composed of a plurality of vertex positions, each vertex position corresponding to one polygon mesh vertex of the polygon mesh connectivity, said vertex position signal being a graph signal of the primal graph of the polygon mesh connectivity, said primal graph composed of primal graph vertices and primal graph edges, said primal graph vertices being the polygon mesh vertices of the polygon mesh connectivity, said primal graph edges being the polygon mesh edges of the polygon mesh connectivity; and said face normal signal is a spherical graph signal on the dual graph of the polygon mesh connectivity, said dual graph being a graph, said dual graph composed of dual graph vertices and dual graph edges, said dual graph vertices being the polygon mesh faces, each of said dual graph edges corresponding to a particular regular edge of the polygon mesh connectivity and composed of the two polygon mesh faces which the regular edge is incident to, said face normal signal including a plurality of face normals, each of said face normals being a point in a N-dimensional sphere of a given radius, each face normal corresponding to one polygon mesh face.

33. A method, as recited in claim 32, where the step of smoothing comprises the following steps:

applying a spherical graph signal smoothing algorithm to the face normal signal to produce a smoothed face normal signal, said smoothed face normal signal being a spherical signal on the dual graph of the polygon mesh connectivity, said smoothed face normal signal including a plurality of smoothed face normals, each of said smoothed face normals being a point in the N-dimensional sphere, each smoothed face normal corresponding to one polygon mesh face; and replacing the face normal signal with the smoothed face normal signal.

34. A method, as recited in claim 32, further comprising repeating the steps of applying and replacing until a face smoothing criterion is met.

35. A method, as recited in claim 32, wherein the step of replacing comprises the following steps:

determining a set of unconstrained polygon mesh faces, each unconstrained polygon mesh face being a particular polygon mesh face of said polygon mesh connectivity; and replacing each face normal of the face normal signal corresponding to each unconstrained polygon mesh face of the set of unconstrained polygon mesh face with the smoothed face normal corresponding to said unconstrained polygon mesh face.

36. A method, as recited in claim 32, wherein the step of integrating comprises the following steps:

determining a polygon mesh vertex neighborhood of each polygon mesh vertex, the polygon mesh vertex neighborhood being a set of neighbor polygon mesh vertices, each neighbor polygon mesh vertex being a particular polygon mesh vertex of the polygon mesh connectivity different from the polygon mesh vertex, each neighbor polygon mesh vertex being connected to the polygon vertex by a particular polygon mesh edge of the polygon mesh connectivity;

computing a neighbor vertex displacement for each neighbor polygon mesh vertex of the polygon mesh vertex neighborhood, the neighbor vertex displacement being a vector in the N-dimensional space, the neighbor vertex displacement computed by subtracting the vertex position corresponding to the polygon mesh vertex from the vertex position corresponding to the neighbor polygon mesh vertex;

obtaining a neighbor vertex weight matrix for each neighbor polygon mesh vertex of the vertex neighborhood, the neighbor vertex weight matrix being a matrix with N rows and N columns; and computing one polygon mesh vertex displacement for each polygon mesh vertex, the polygon mesh vertex displacement being computed as the sum of a plurality of weighted neighbor vertex displacements, each weighted neighbor vertex displacement corresponding to one neighbor polygon mesh vertex, each weighted neighbor vertex displacement being equal to the product of the neighbor vertex weight matrix corresponding to the neighbor polygon mesh vertex tunes the neighbor vertex displacement corresponding to the same neighbor polygon mesh vertex; and adding each polygon mesh vertex displacement to the corresponding vertex position of the vertex position signal, to produce the corresponding filtered vertex position of the filtered vertex signal.

37. A method, as recited in claim 36, where the step of obtaining each neighbor vertex weight matrix for each neighbor polygon mesh vertex comprises the steps of:

identifying a set of polygon mesh faces incident to a neighbor polygon mesh edge, the neighbor polygon mesh edge being a polygon mesh edge, the polygon mesh edge having the polygon mesh vertex and the neighbor polygon mesh vertex as ends, the set of polygon mesh faces containing one or more edge polygon mesh faces, each edge polygon mesh face being a polygon mesh face incident to the neighbor polygon mesh edge; and obtaining the neighbor vertex weight matrix as the average of a set of projection matrices, each projection matrix in the set of projection matrices being a matrix with N rows and N columns, each projection matrix in the set of projection matrices corresponding to one particular polygon mesh face in the set of polygon mesh faces, each projection matrix in the set of projection matrices representing the orthogonal projection onto a face plane, the face plane being a plane in N-dimensional space.

38. A method, as recited in claim 37, further comprising the following steps:
  obtaining a first linear combination parameter and a second linear combination parameter;
  constructing a combination neighbor vertex weight matrix for each neighbor vertex weight matrix as the sum of a first term and a second term, the first term being equal to the first linear combination parameter times the identity matrix of N rows and N columns, the second term being equal to the second linear combination parameter times said neighbor vertex weight matrix; and
  replacing each neighbor vertex weight matrix by the corresponding combination neighbor vertex weight matrix.

39. An article of manufacture comprising a computer usable medium having computer readable program code means embodied therein for causing spherical graph signal smoothing, the computer readable program code means in said article of manufacture comprising computer readable program code means for causing a computer to effect the steps of claim 1.

40. A program storage device readable by machine, tangibly embodying a program of instructions executable by the machine to perform method steps for spherical graph signal smoothing, said method steps comprising the steps of claim 1.

41. An article of manufacture comprising a computer usable medium having computer readable program code means embodied therein for causing graph signal filtering, the computer readable program code means in said article of manufacture comprising computer readable program code means for causing a computer to effect the steps of claim 17.

42. A program storage device readable by machine, tangibly embodying a program of instructions executable by the machine to perform method steps for graph signal filtering, said method steps comprising the steps of claim 17.

43. An apparatus comprising:
  means for obtaining a first spherical graph signal defined on a graph, the graph including a plurality of graph vertices and a plurality of graph edges, the first spherical graph signal including a plurality of spherical signal points, each spherical signal point being a point in a N-dimensional sphere of a given radius each spherical signal point corresponding to one of the graph vertices;
  means for applying a spherical graph signal smoothing algorithm to the first spherical graph signal to produce a smoothed spherical graph signal defined on the graph, the smoothed spherical graph signal including a plurality of smoothed spherical signal points, each smoothed spherical signal point being a point in the N-dimensional sphere, each of the smoothed spherical signal points corresponding to one of the graph vertices; and means for replacing the first spherical graph signal with the smoothed spherical graph signal.

44. An apparatus comprising:
  means for obtaining a graph signal defined on a graph, the graph including a plurality of graph vertices and a plurality of graph edges, the graph signal including a plurality of signal points, each signal point being a point in a N-dimensional space, each signal point corresponding to one of the graph vertices;
  means for applying en anisotropic graph signal filter is algorithm to the graph signal to produce a filtered graph signal defined on the graph, the filtered graph signal including a plurality of filtered signal points, each filtered signal point being a point in the same N-dimensional space, each of the filtered signal points corresponding to one of the graph vertices; and
  means for replacing the graph signal with the filtered graph signal.

45. An apparatus comprising:
  means for obtaining a polygon mesh having a polygon mesh connectivity and a vertex position signal;
  means for obtaining a face normal signal for the polygon mesh;
  means for smoothing the face normal signal;
  means for integrating the vertex position signal and the face normal signal to produce a filtered vertex position signal; and
  means for replacing the vertex position signal with the filtered vertex position signal.

46. A computer program product comprising a computer usable medium having computer readable program code means embodied therein for causing spherical graph signal smoothing, the computer readable program code means in said computer program product comprising computer readable program code means for causing a computer to effect the functions of claim 43.

47. A computer program product comprising a computer usable medium having computer readable program code means embodied therein for causing graph signal filtering, the computer readable program code means in said computer program product comprising computer readable program code means for causing a computer to effect the functions of claim 44.

48. An article of manufacture comprising a computer usable medium having computer readable program code means embodied therein for causing polygon mesh denoising, the computer readable program code means in said article of manufacture comprising computer readable program code means for causing a computer to effect the steps of claim 28.

49. A program storage device readable by machine, tangibly embodying a program of instructions executable by the machine to perform method steps for polygon mesh denoising, said method steps comprising the steps of claim 28.

50. A computer program product comprising a computer usable medium having computer readable program code means embodied therein for causing polygon mesh denoising, the computer readable program code means in said computer program product comprising computer readable program code means for causing a computer to effect the functions of claim 45.

* * * * *